US012598625B2

(12) United States Patent
Yuan et al.

(10) Patent No.: US 12,598,625 B2
(45) Date of Patent: Apr. 7, 2026

(54) FEEDBACK CORRESPONDING TO UNIFIED TRANSMISSION CONFIGURATION INDICATORS IN SEMI-PERSISTENT SCHEDULING RELEASE DOWNLINK CONTROL INFORMATION TRANSMISSIONS

(71) Applicant: QUALCOMM Incorporated, San Diego, CA (US)

(72) Inventors: Fang Yuan, Beijing (CN); Yan Zhou, San Diego, CA (US); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 18/262,545

(22) PCT Filed: Mar. 17, 2021

(86) PCT No.: PCT/CN2021/081256
§ 371 (c)(1),
(2) Date: Jul. 21, 2023

(87) PCT Pub. No.: WO2022/193167
PCT Pub. Date: Sep. 22, 2022

(65) Prior Publication Data
US 2024/0080858 A1 Mar. 7, 2024

(51) Int. Cl.
*H04W 72/232* (2023.01)
*H04L 1/1812* (2023.01)
(Continued)

(52) U.S. Cl.
CPC ......... *H04W 72/232* (2023.01); *H04L 1/1812* (2013.01); *H04W 72/11* (2023.01); *H04W 72/1273* (2013.01)

(58) Field of Classification Search
CPC ... H04L 1/1812; H04L 5/0094; H04L 5/0055; H04L 1/1896; H04W 72/11; H04W 72/232; H04W 72/1273
See application file for complete search history.

(56) References Cited

U.S. PATENT DOCUMENTS

2019/0222289 A1 7/2019 John Wilson et al.
2020/0205141 A1 6/2020 Khoshnevisan et al.
(Continued)

FOREIGN PATENT DOCUMENTS

CN 110380834 A 10/2019
CN 110535570 A 12/2019

OTHER PUBLICATIONS

International Search Report and Written Opinion—PCT/CN2021/081256—ISA/EPO—Nov. 25, 2021.

*Primary Examiner* — Andrew Lee
(74) *Attorney, Agent, or Firm* — Harrity & Harrity, LLP

(57) ABSTRACT

Various aspects of the present disclosure generally relate to wireless communication. In some aspects, a user equipment (UE) may receive a downlink control information (DCI) transmission that indicates a unified transmission configuration indicator (TCI), wherein the DCI transmission comprises a semi-persistent scheduling (SPS)-release DCI transmission releasing an SPS physical downlink shared channel (PDSCH) configuration. The UE may transmit hybrid automatic repeat request acknowledgement (HARQ-ACK) feedback using a HARQ-ACK codebook, wherein the HARQ-ACK feedback comprises an acknowledgment (ACK) to indicate successful reception of the unified TCI in the DCI transmission or a negative acknowledgement (NACK) to indicate a failed reception of the unified TCI in the DCI transmission. Numerous other aspects are described.

25 Claims, 12 Drawing Sheets

900 ⟶

Receive a downlink control information (DCI) transmission that indicates a unified transmission configuration indicator (TCI), wherein 910 ⌇ the DCI transmission comprises a semi-persistent scheduling (SPS)-release DCI transmission releasing an SPS physical downlink shared channel (PDSCH) configuration Transmit hybrid automatic repeat request acknowledgement (HARQ-ACK) feedback using a HARQ-ACK codebook, wherein the HARQ-ACK feedback comprises an acknowledgment (ACK) to indicate 920 ⌇ successful reception of the unified TCI in the DCI transmission or a negative acknowledgement (NACK) to indicate a failed reception of the unified TCI in the DCI transmission

(51) Int. Cl.
  *H04W 72/11* (2023.01)
  *H04W 72/1273* (2023.01)

(56) References Cited

U.S. PATENT DOCUMENTS

| | | | |
|---|---|---|---|
| 2022/0116157 A1* | 4/2022 | Papasakellariou .... | H04L 1/1664 |
| 2022/0116158 A1* | 4/2022 | Park ..................... | H04L 1/1896 |
| 2022/0159692 A1* | 5/2022 | Lee ....................... | H04W 72/23 |
| 2022/0174706 A1* | 6/2022 | Saber ................... | H04W 72/23 |
| 2022/0232541 A1* | 7/2022 | Xu ........................ | H04L 1/1854 |
| 2023/0026094 A1* | 1/2023 | Ma ........................ | H04W 72/23 |
| 2023/0041764 A1* | 2/2023 | Park ......................... | H04L 5/14 |
| 2023/0189287 A1* | 6/2023 | Gao ..................... | H04L 5/0055 |
| | | | 370/329 |
| 2024/0031070 A1* | 1/2024 | Jung .................. | H04W 72/232 |
| 2024/0040556 A1* | 2/2024 | Xu ........................ | H04L 5/0048 |
| 2024/0080929 A1* | 3/2024 | Matsumura .......... | H04L 1/1861 |

* cited by examiner

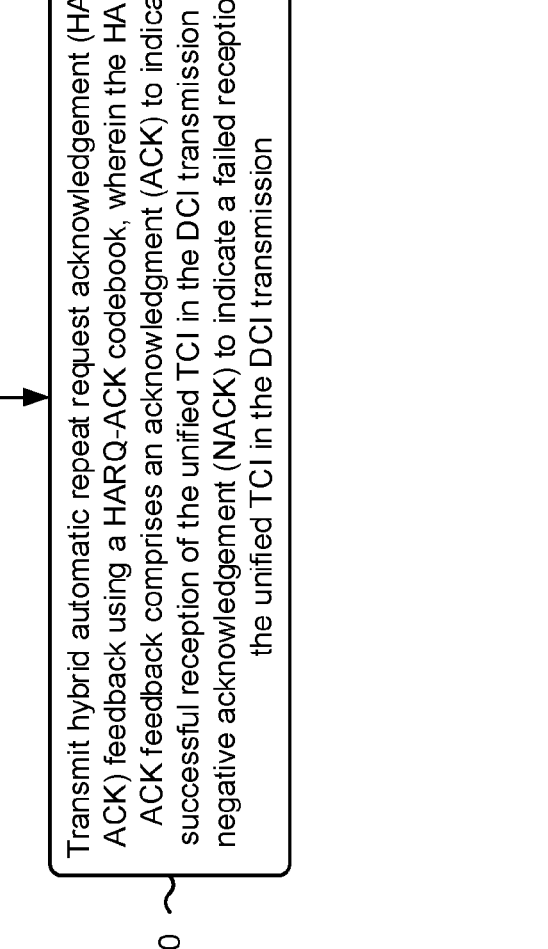

Receive a downlink control information (DCI) transmission that indicates a unified transmission configuration indicator (TCI), wherein the DCI transmission comprises a semi-persistent scheduling (SPS)-release DCI transmission releasing an SPS physical downlink shared channel (PDSCH) configuration Transmit hybrid automatic repeat request acknowledgement (HARQ-ACK) feedback using a HARQ-ACK codebook, wherein the HARQ-ACK feedback comprises an acknowledgment (ACK) to indicate successful reception of the unified TCI in the DCI transmission or a negative acknowledgement (NACK) to indicate a failed reception of the unified TCI in the DCI transmission

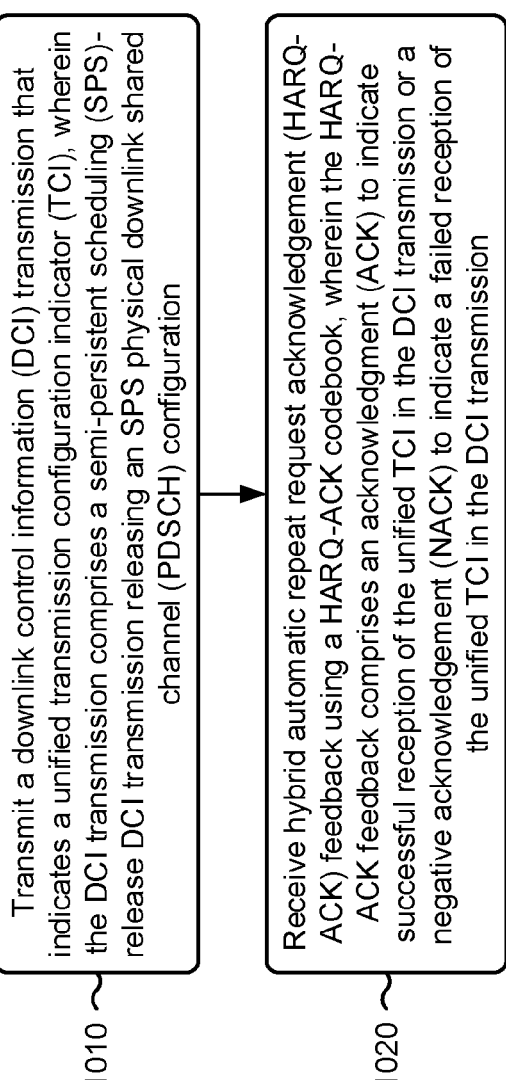

Transmit a downlink control information (DCI) transmission that indicates a unified transmission configuration indicator (TCI), wherein the DCI transmission comprises a semi-persistent scheduling (SPS)-release DCI transmission releasing an SPS physical downlink shared channel (PDSCH) configuration

1010

Receive hybrid automatic repeat request acknowledgement (HARQ-ACK) feedback using a HARQ-ACK codebook, wherein the HARQ-ACK feedback comprises an acknowledgment (ACK) to indicate successful reception of the unified TCI in the DCI transmission or a negative acknowledgement (NACK) to indicate a failed reception of the unified TCI in the DCI transmission

FEEDBACK CORRESPONDING TO UNIFIED TRANSMISSION CONFIGURATION INDICATORS IN SEMI-PERSISTENT SCHEDULING RELEASE DOWNLINK CONTROL INFORMATION TRANSMISSIONS

CROSS-REFERENCE TO RELATED APPLICATION

This application is a 371 national stage application of PCT Application No. PCT/CN2021/081256 filed on Mar. 17, 2021, entitled "FEEDBACK CORRESPONDING TO UNIFIED TRANSMISSION CONFIGURATION INDICATORS IN SEMI-PERSISTENT SCHEDULING RELEASE DOWNLINK CONTROL INFORMATION TRANSMISSIONS," which is hereby expressly incorporated by reference herein.

FIELD OF THE DISCLOSURE

Aspects of the present disclosure generally relate to wireless communication and to techniques and apparatuses for feedback corresponding to unified transmission configuration indicators in semi-persistent scheduling release downlink control information transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3 GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a downlink control information (DCI) transmission that indicates a unified transmission configuration indicator (TCI), wherein the DCI transmission comprises a semi-persistent scheduling (SPS)-release DCI transmission releasing an SPS physical downlink shared channel (PDSCH) configuration; and transmitting hybrid automatic repeat request acknowledgement (HARQ-ACK) feedback using a HARQ-ACK codebook, wherein the HARQ-ACK feedback comprises an acknowledgment (ACK) to indicate successful reception of the unified TCI in the DCI transmission or a negative acknowledgement (NACK) to indicate a failed reception of the unified TCI in the DCI transmission.

In some aspects, a method of wireless communication performed by a base station includes transmitting a DCI transmission that indicates a unified TCI, wherein the DCI transmission comprises a SPS-release DCI transmission releasing an SPS PDSCH configuration; and receiving HARQ-ACK feedback using a HARQ-ACK codebook, wherein the HARQ-ACK feedback comprises an ACK to indicate successful reception of the unified TCI in the DCI transmission or a NACK to indicate a failed reception of the unified TCI in the DCI transmission.

In some aspects, a UE for wireless communication includes a memory; and one or more processors, coupled to the memory, configured to: receive a DCI transmission that indicates a unified TCI, wherein the DCI transmission comprises a SPS-release DCI transmission releasing an SPS PDSCH configuration; and transmit HARQ-ACK feedback using a HARQ-ACK codebook, wherein the HARQ-ACK feedback comprises an ACK to indicate successful reception of the unified TCI in the DCI transmission or a NACK to indicate a failed reception of the unified TCI in the DCI transmission.

In some aspects, a base station for wireless communication includes a memory; and one or more processors, coupled to the memory, configured to: transmit a DCI transmission that indicates a unified TCI, wherein the DCI transmission comprises a SPS-release DCI transmission releasing an SPS PDSCH configuration; and receive HARQ-ACK feedback using a HARQ-ACK codebook, wherein the HARQ-ACK feedback comprises an ACK to indicate successful reception of the unified TCI in the DCI transmission or a NACK to indicate a failed reception of the unified TCI in the DCI transmission.

In some aspects, a non-transitory computer-readable medium storing a set of instructions for wireless communication includes one or more instructions that, when executed by one or more processors of a UE, cause the UE to: receive a DCI transmission that indicates a unified TCI, wherein the DCI transmission comprises a SPS-release DCI transmission releasing an SPS PDSCH configuration; and transmit HARQ-ACK feedback using a HARQ-ACK codebook, wherein the HARQ-ACK feedback comprises an ACK to indicate successful reception of the unified TCI in the DCI transmission or a NACK to indicate a failed reception of the unified TCI in the DCI transmission.

In some aspects, a non-transitory computer-readable medium storing a set of instructions for wireless communication includes one or more instructions that, when executed by one or more processors of a base station, cause the base station to: transmit a DCI transmission that indicates a unified TCI, wherein the DCI transmission comprises a SPS-release DCI transmission releasing an SPS PDSCH configuration; and receive HARQ-ACK feedback using a HARQ-ACK codebook, wherein the HARQ-ACK feedback comprises an ACK to indicate successful reception of the unified TCI in the DCI transmission or a NACK to indicate a failed reception of the unified TCI in the DCI transmission.

In some aspects, an apparatus for wireless communication includes means for receiving a DCI transmission that indicates a unified TCI, wherein the DCI transmission comprises a SPS-release DCI transmission releasing an SPS PDSCH configuration; and means for transmitting HARQ-ACK feedback using a HARQ-ACK codebook, wherein the HARQ-ACK feedback comprises an ACK to indicate successful reception of the unified TCI in the DCI transmission or a NACK to indicate a failed reception of the unified TCI in the DCI transmission.

In some aspects, an apparatus for wireless communication includes means for transmitting a DCI transmission that indicates a unified TCI, wherein the DCI transmission comprises a SPS-release DCI transmission releasing an SPS PDSCH configuration; and means for receiving HARQ-ACK feedback using a HARQ-ACK codebook, wherein the HARQ-ACK feedback comprises an ACK to indicate successful reception of the unified TCI in the DCI transmission or a NACK to indicate a failed reception of the unified TCI in the DCI transmission.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9 and 10 are diagrams illustrating example processes associated with feedback corresponding to unified TCIs in SPS release DCI transmissions, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
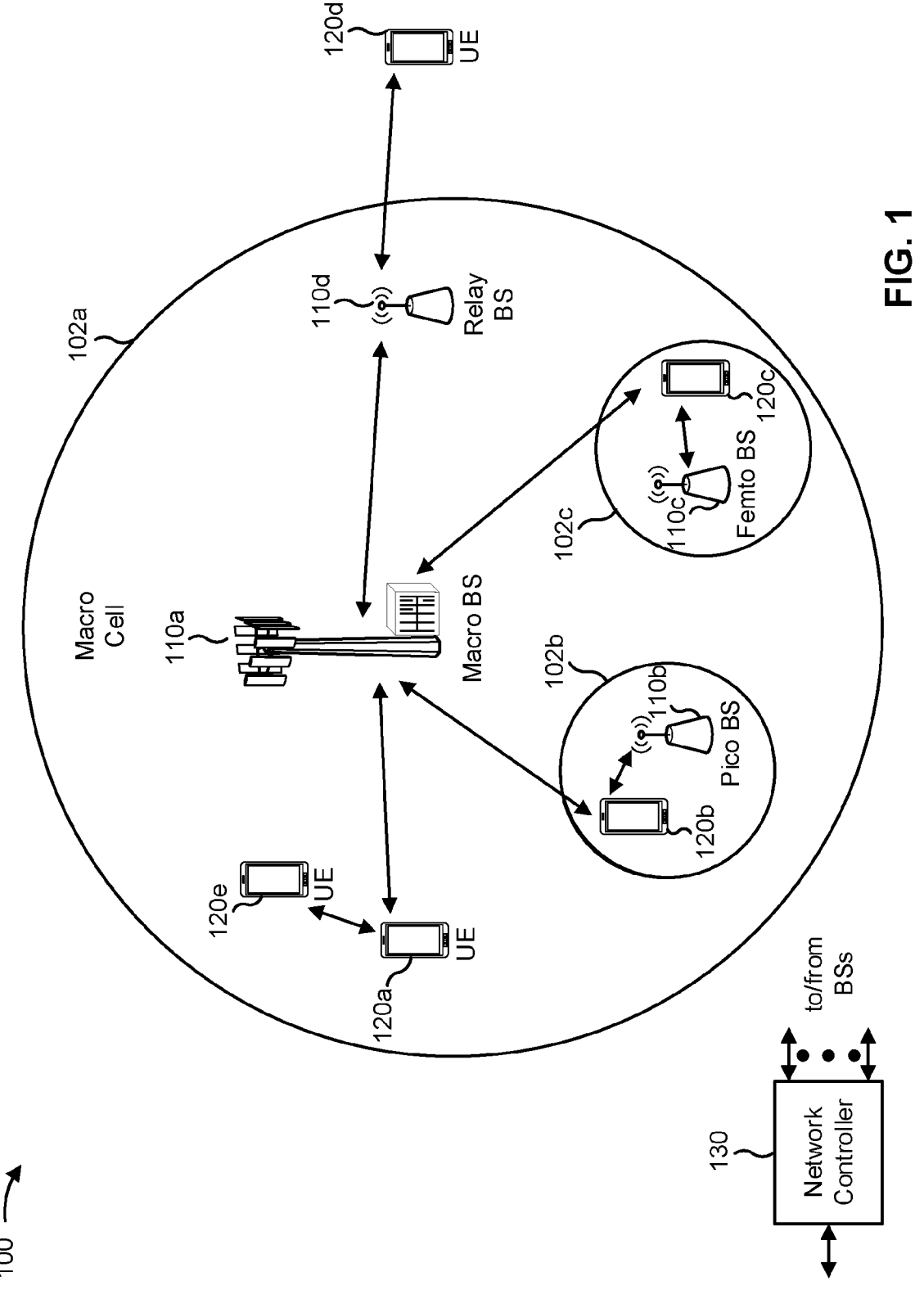
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
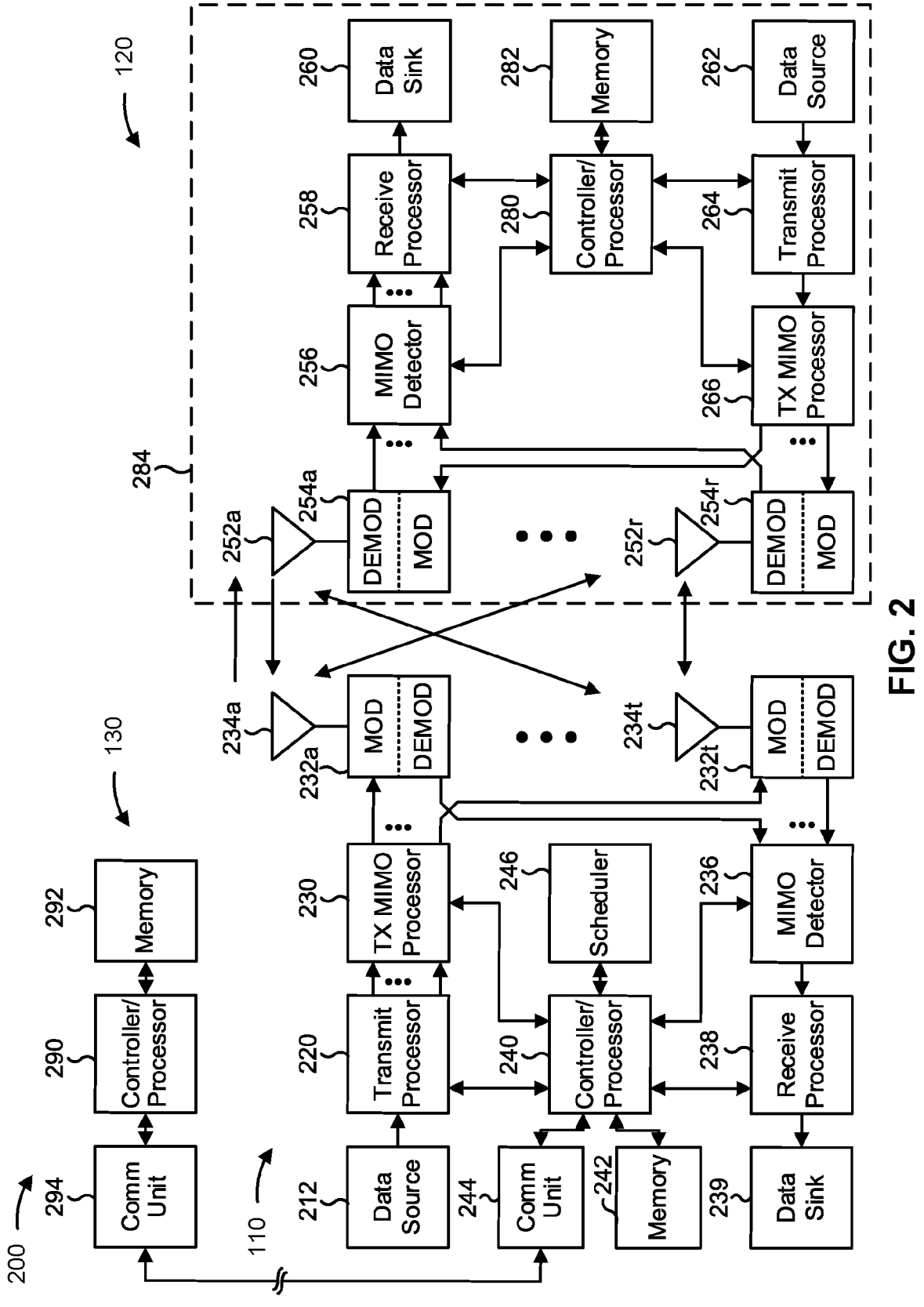
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-10.

Controller/processor 240 of base station 110, controller/processor 280 of UE 120, and/or any other component(s) of FIG. 2 may perform one or more techniques associated with feedback corresponding to unified transmission configuration indicators (TCIs) in semi-persistent scheduling (SPS) release downlink control information (DCI) transmissions, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, the UE includes means for receiving a DCI transmission that indicates a unified TCI, wherein the DCI transmission comprises an SPS-release DCI transmission releasing an SPS physical downlink shared channel (PDSCH) configuration; or means for transmitting hybrid automatic repeat request acknowledgement (HARQ-ACK) feedback using a HARQ-ACK codebook, wherein the HARQ-ACK feedback comprises an acknowledgment (ACK) to indicate successful reception of the unified TCI in the DCI transmission or a negative acknowledgement (NACK) to indicate a failed reception of the unified TCI in the DCI transmission. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining a location in the static HARQ-ACK codebook for the HARQ-ACK feedback. In some aspects, the UE includes means for determining that the SPS PDSCH configuration is activated. In some aspects, the UE includes means for determining that the SPS PDSCH configuration is not activated.

In some aspects, the UE includes means for identifying a plurality of configured SPS PDSCH occasions, wherein the most recently activated SPS PDSCH occasion is associated with a HARQ identifier indicated in the DCI transmission. In some aspects, the UE includes means for receiving a default PDSCH occasion configuration that configures the default PDSCH occasion.

In some aspects, the UE includes means for receiving an additional DCI transmission that indicates an additional unified TCI, wherein the additional DCI transmission comprises an additional SPS-release DCI transmission releasing an the SPS PDSCH configuration; means for determining that the additional DCI transmission is associated with a location in the static HARQ-ACK codebook with which the DCI transmission is associated; or means for identifying the additional DCI transmission as an error based at least in part on determining that the additional DCI transmission is associated with the location in the static HARQ-ACK codebook with which the DCI transmission is associated.

In some aspects, the UE includes means for receiving at least one additional DCI transmission that indicates at least one additional unified TCI, wherein the at least one additional DCI transmission comprises at least one additional SPS-release DCI transmission releasing the SPS PDSCH configuration; or means for determining that a number of SPS PDSCH occasions in the set of SPS PDSCH occasions is greater than, or equal to, a number of unified TCIs in a set of unified TCIs that includes the unified TCI and the at least one additional unified TCI.

In some aspects, the UE includes means for receiving at least one additional DCI transmission that indicates at least one additional unified TCI, wherein the at least one additional DCI transmission comprises at least one additional SPS-release DCI transmission releasing the SPS PDSCH configuration; means for determining that a number of SPS PDSCH occasions in the set of SPS PDSCH occasions is less than a number of unified TCIs in a set of unified TCIs that includes the unified TCI and the at least one additional unified TCI; or means for determining that a HARQ-ACK codebook DCI field includes a semi-static indication.

In some aspects, the UE includes means for determining that a number of DCI transmissions of a set of DCI transmissions that include the DCI transmission and the at least one additional DCI transmission is greater than the number of SPS PDSCH occasions in the set of SPS PDSCH occasions by at least one excess DCI transmission.

In some aspects, the UE includes means for receiving at least one additional DCI transmission that indicates at least one additional unified TCI, wherein the at least one additional DCI transmission comprises at least one additional SPS-release DCI transmission; or means for determining a location in the static HARQ-ACK codebook for an additional HARQ-ACK feedback corresponding to the at least one additional DCI transmission based at least in part on at least one additional dedicated bit of the one or more dedicated bits being associated with the at least one additional DCI transmission, wherein the dedicated bit and the at least one additional dedicated bits are different.

In some aspects, the base station includes means for transmitting a DCI transmission that indicates a unified TCI, wherein the DCI transmission comprises an SPS-release DCI transmission releasing an SPS PDSCH configuration; or means for receiving HARQ-ACK feedback using a HARQ-ACK codebook, wherein the HARQ-ACK feedback comprises an ACK to indicate successful reception of the unified TCI in the DCI transmission or a NACK to indicate a failed reception of the unified TCI in the DCI transmission. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting a default PDSCH occasion configuration that configures the default PDSCH occasion. In some aspects, the base station includes means for transmitting an additional DCI transmission that indicates an additional unified TCI, wherein the additional DCI transmission comprises an additional SPS-release DCI transmission releasing the SPS PDSCH configuration.

In some aspects, the base station includes means for transmitting at least one additional DCI transmission that indicates at least one additional unified TCI, wherein the at least one additional DCI transmission comprises at least one additional SPS-release DCI transmission releasing the SPS PDSCH configuration. In some aspects, the base station includes means for transmitting at least one additional DCI transmission that indicates at least one additional unified TCI, wherein the at least one additional DCI transmission comprises at least one additional SPS-release DCI transmission releasing the SPS PDSCH configuration. In some aspects, the base station includes means for transmitting at least one additional DCI transmission that indicates at least one additional unified TCI, wherein the at least one additional DCI transmission comprises at least one additional SPS-release DCI transmission, wherein While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Wireless communication devices such as UEs and base stations may use beams to facilitate communication with one another. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

Antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array) can be dynamically controlled by modifying the phase shifts or phase offsets of the multiple signals relative to each other.

In 5G and other types of RATs, beamforming may be used for communications between a UE and a base station, such as for millimeter wave communications and/or the like. In such a case, the base station may provide the UE with a configuration of TCI states that respectively indicate beams that may be used by the UE, such as for receiving a PDSCH. The base station may indicate an activated TCI state to the UE, which the UE may use to select a beam for receiving the PDSCH.

A beam indication is an indication of a beam. A beam indication may be, or include, a TCI state information element, a beam identifier (ID), spatial relation information, a TCI state ID, a close loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a gel-Type 1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1

(L1)-based beam indication using at least UE-specific (unicast) DCI to indicate joint or separate DL/UL beam indications from active TCI states. In some cases, existing DCI formats 1_0, 1_1, 1_2, 0_1, 0_2, 0_0, and/or 2_x may be reused for beam indication. For example, DCI transmissions may include a beam indication having one of six types of beam indication for unified TCI. Type 1 may include a Joint DL/UL common TCI state to indicate a common beam for at least one DL channel and/or reference signal plus at least one UL channel and/or reference signal. Type 2 may include a separate DL common TCI state to indicate a common beam for more than one DL channel and/or reference signal. Type 3 may include a separate UL common TCI state to indicate a common beam for more than one UL channel and/or reference signal. Type 4 may include a separate DL single channel/reference signal TCI state to indicate a beam for a single DL channel and/or reference signal. Type 5 may include a separate UL single channel/reference signal TCI state to indicate a beam for a single UL channel and/or reference signal. Type 6 may include UL spatial relation info (e.g. an SRS resource indicator (SRI)) to indicate a beam for a single UL channel and/or reference signal. A source reference signal in unified TCIs may provide QCL information at least for at least one of PDSCH and physical downlink control channel (PDCCH) receptions in a serving cell, and a source reference signal in unified TCIs, if applicable, may provide a reference for determining common spatial transmit filter(s) for at least one of SRS, physical uplink shared channel (PUSCH) and physical uplink control channel (PUCCH) transmissions in a serving cell.

The network may include a support mechanism for a UE to acknowledge successful decoding of a beam indication by using the acknowledgment/negative acknowledgment (ACK/NACK) of the PDSCH scheduled by the DCI carrying the beam indication as an ACK for the beam indication (e.g., TCI). However, in some cases, a DCI transmission may be used to indicate a TCI state without including a downlink assignment. For example, a DCI transmission having one of the formats listed above may be used to indicate TCI state but may not include any scheduling information for downlink data. In some cases, for example, the DCI transmission may be an SPS release DCI transmission that releases an SPS PDSCH configuration.

Figure 3:
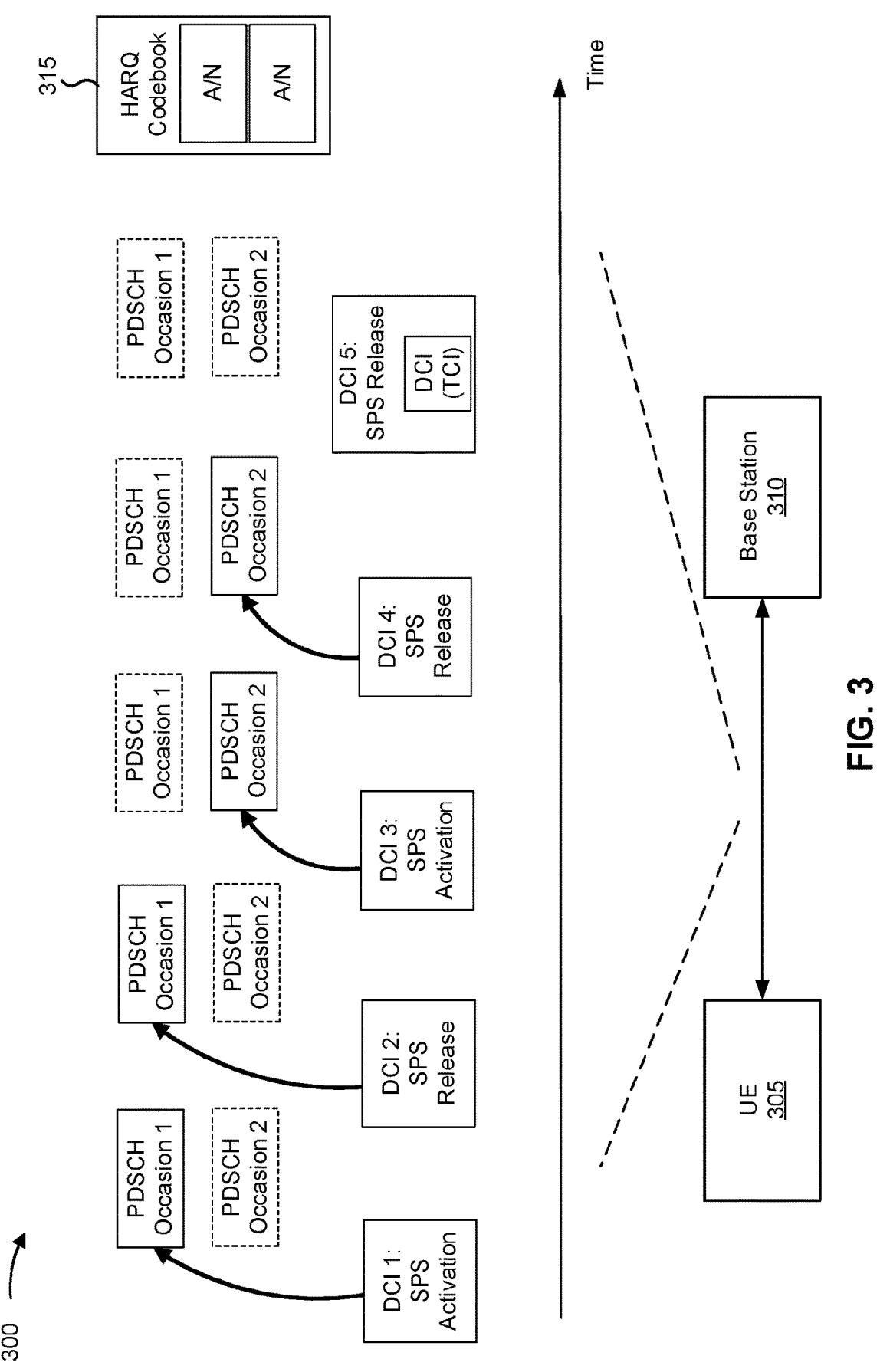
FIG. 3 is a diagram illustrating an example of semi-persistent scheduling (SPS) feedback configurations, in accordance with the present disclosure.

FIG. 3 is a diagram illustrating an example 300 of SPS release DCI transmissions and associated feedback configurations, in accordance with the present disclosure. As shown, a UE 305 and a base station 310 may communicate with one another. In some cases, the UE 305 and the base station 310 may communicate via a wireless communication network such as wireless network 100 shown in FIG. 1.

A first DCI transmission (shown as "DCI 1") may activate one or more SPS PDSCH configurations, which may have one or more PDSCH occasions (shown as "PDSCH Occasion 1" and "PDSCH Occasion 2"). The PDSCH occasions for a same SPS PDSCH configuration may be periodically transmitted. In some cases, for example, the DCI 1 may activate a first SPS configuration associated with PDSCH Occasion 1 but may not activate PDSCH Occasion 2 (non-activated PDSCH occasions are indicated in FIG. 3 by dashed borders). A second DCI transmission (shown as "DCI 2") may release the SPS configuration activated by DCI 1. As shown, a third DCI transmission (shown as "DCI 3") may activate an SPS configuration associated with PDSCH Occasion 2 and a fourth DCI transmission (shown as "DCI 4") may release the SPS configuration activated by DCI 3.

In some aspects, a DCI transmission may be validated as an SPS activation or release DCI transmission based at least in part on a cyclic redundancy check (CRC) of a corresponding DCI format being scrambled with a configured scheduling radio network temporary identifier (CS-RNTI), the new data indicator field in the DCI format for the enabled transport block being set to '0', a DCI Format indicator (DFI) flag field, if present, in the DCI format being set to '0'.

A DCI transmission may include one or more indications of whether the DCI transmission activates or releases one SPS configuration or more than one SPS configuration. In some cases, a hybrid automatic repeat request (HARQ) process identifier (ID) field in the DCI format may be used to indicate an SPS release. For example, if a UE is provided more than one configuration for SPS PDSCH, and if the UE is not provided a ConfiguredGrantConfigType2DeactivationStateList parameter or a sps-ConfigDeactivationStateList parameter, a value of the HARQ process ID field in a DCI format may indicate a release for a corresponding UL grant Type 2 PUSCH or for a SPS PDSCH configuration with a same value as provided by a parameter ConfiguredGrantConfigIndex or by a parameter sps-ConfigIndex, respectively. If the UE is provided more than one configuration for SPS PDSCH, and if the UE is provided a ConfiguredGrantConfigType2DeactivationStateList parameter or a sps-ConfigDeactivationStateList parameter, a value of the HARQ process ID field in a DCI format may indicate a corresponding entry for scheduling release of one or more UL grant Type 2 PUSCH or SPS PDSCH configurations, respectively.

An SPS release DCI transmission may have a corresponding ACK/NACK (also referred to as "A/N") bit in a HARQ-ACK codebook 315 to improve indication reliability, for example. A location in a Type-1 HARQ-ACK codebook for HARQ-ACK information corresponding to a single SPS PDSCH release may be the same as for a corresponding SPS PDSCH occasion. A location in the Type-1 HARQ-ACK codebook for HARQ-ACK information corresponding to multiple SPS PDSCH releases by a single DCI format may be the same as for a corresponding SPS PDSCH reception with the lowest SPS configuration index among the multiple SPS PDSCH releases. The SPS PDSCH occasion may be determined by the SPS activation DCI transmission.

As shown in FIG. 3, an SPS release DCI transmission (shown as "DCI 5") having a TCI field may be used to indicate TCI even after an SPS is released. For example, as shown, when DCI 5 is received, neither PDSCH Occasion 1 nor PDSCH Occasion 2 is active. The validation and indication fields of such a DCI transmission may be indicated in the same manner as an SPS release DCI. However, the applicable SPS PDSCH occasion may not be clear after the SPS is released or if it is not activated. Thus, the location of the A/N bit for the SPS release with a unified TCI may not be clear. As a result, beam indications in SPS release DCI transmissions may lead to unnecessary retransmissions due to a lack of feedback, which may increase network overhead and decrease network efficiency, thereby having a negative impact on network performance.

Some aspects of techniques and apparatuses described herein may facilitate providing feedback corresponding to unified TCI indications in SPS release DCI transmissions. For example, in some aspects, a UE may receive a DCI transmission that indicates a unified TCI, wherein the DCI transmission comprises an SPS release DCI transmission releasing an SPS PDSCH configuration. The UE may transmit HARQ-ACK feedback corresponding to, and in response to, the unified TCI indication in the DCI. The HARQ-ACK feedback may include an ACK (as a confirmation) to indicate successful reception of the unified TCI in the DCI transmission or a NACK to indicate a failed reception of the unified TCI in the DCI transmission. The UE may receive the DCI transmission in a first slot and may transmit the HARQ-ACK feedback in a second slot determined based at least in part on a value of a slot parameter. In this manner, some aspects may facilitate avoidance of unnecessary retransmissions due to a lack of feedback, and may decrease network overhead and increase network efficiency, thereby having a positive impact on network performance.

As indicated above, FIG. 3 is provided as an example. Other examples may differ from what is described with regard to FIG. 3.

Figure 4:
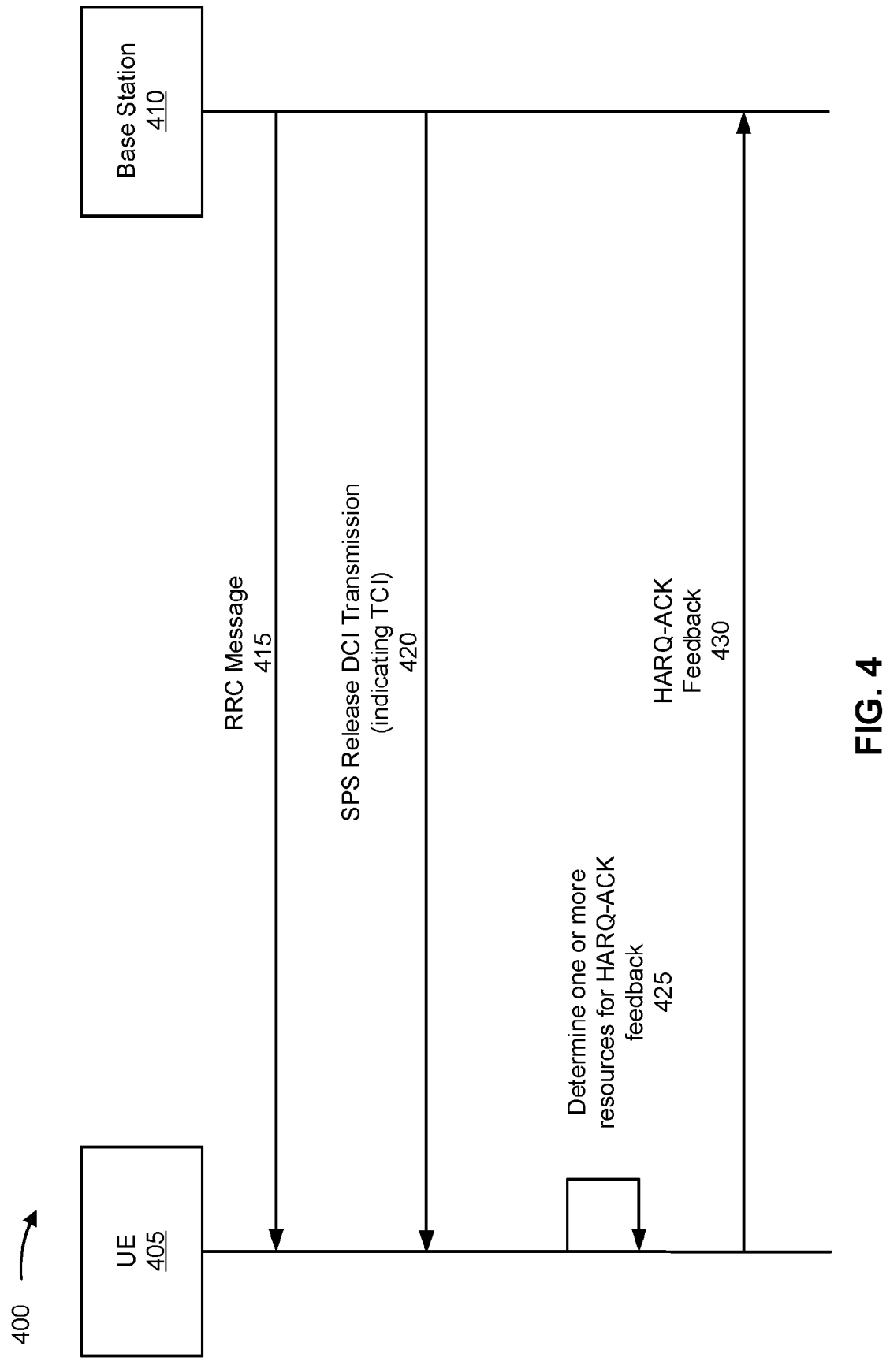
FIGS. 4-8 are diagrams illustrating examples associated with feedback corresponding to unified transmission configuration indicators (TCIs) in SPS release downlink control information (DCI) transmissions, in accordance with the present disclosure.

FIG. 4 is a diagram illustrating an example 400 associated with feedback corresponding to unified TCIs in SPS release DCI transmissions, in accordance with the present disclosure. As shown, a UE 405 and a base station 410 may communicate with one another.

As shown by reference number 415, the base station 410 may transmit, and the UE 405 may receive, a radio resource control (RRC) message. The RRC message may indicate one or more parameters that may be used by the UE 405 to determine a slot, a PUCCH resource and/or an ACK/NACK location in a HARQ codebook for transmitting HARQ feedback associated with, and in response to, a unified TCI indication in an SPS release DCI transmission. For example, in some aspects, the RRC message may indicate a value of a slot parameter that may be used to determine the slot in which to transmit the HARQ feedback. In some aspects, the RRC message may include information from which the UE 405 may determine a PUCCH resource for transmitting the HARQ feedback. For example, in some aspects, the RRC message may indicate a PUCCH resource index configured by a parameter such as TCI-PUCCH. In some aspects, the RRC message may indicate an ACK/NACK location in a static HARQ-ACK codebook for the HARQ feedback (e.g., the first bit or last bit in the HARQ-ACK codebook). In some aspects, a predetermined PDSCH occasion may be associated with an ACK/NACK location in a static HARQ-ACK codebook for the HARQ feedback, and the RRC message may indicate that associated PDSCH occasion.

In some aspects, the RRC message may indicate a default PDSCH occasion configuration that configures a default PDSCH occasion. The default PDSCH occasion may facilitate determining the location in the HARQ-ACK codebook for the HARQ-ACK feedback. In some aspects, the UE 405 may receive the default PDSCH occasion configuration via a dummy SPS activation DCI transmission, a PDSCH occasion indication, and/or a time domain resource assignment (TDRA).

As shown by reference number 420, the base station 410 may transmit, and the UE 405 may receive, a DCI transmission that indicates a unified TCI. The DCI transmission may include an SPS release DCI transmission releasing an SPS PDSCH configuration. In some aspects, the SPS PDSCH configuration released by the DCI transmission may be activated. In some aspects, the SPS PDSCH configuration released by the DCI transmission may not be activated (or may have been previously released).

As shown by reference number 425, the UE 405 may determine one or more resources to be used to transmit HARQ-ACK feedback corresponding to the unified TCI in the DCI transmission. As shown by reference number 430, the UE 405 may transmit, and the base station 410 may receive, the HARQ-ACK feedback based at least in part on the determined resources. The HARQ-ACK feedback may include an ACK to indicate successful reception of the DCI transmission or a NACK to indicate a failed reception of the DCI transmission.

In some aspects, for example, the UE 405 may transmit the HARQ-ACK feedback corresponding to, or in response to, the unified TCI using a PUCCH transmission in a second slot that is separated from the first slot n where the UE 405 receives the DCI, by a number of slots indicated by a value of a slot parameter, k. That is, the second slot may be determined by n+k. The DCI format of the DCI transmission may include a PDSCH-to-HARQ feedback timing indicator field (e.g., for indicating a slot offset, k1) that indicates the value of the slot parameter k. The DCI format of the DCI transmission may include a PDSCH-to-HARQ feedback timing indicator field that indicates a slot offset k1 and a time domain resource assignment field that indicates a parameter k0. A sum of a value of the TDRA field and the PDSCH-to-HARQ feedback timing indicator field may indicate the value of the slot parameter: k=k0+k1. In some aspects, the RRC message may indicate the value of the slot parameter k. In some aspects, the value of the slot parameter k may be zero, and the second slot may include a last slot of the PUCCH transmission that overlaps with reception of the DCI transmission. In some aspects, the DCI transmission may include a data-to-uplink timing indicator field that indicates the value of the slot parameter.

The HARQ-ACK feedback may be transmitted by the UE using a HARQ-ACK codebook. For example, in some aspects, the UE 405 may transmit the HARQ-ACK feedback using a dynamic HARQ-ACK codebook (e.g., a Type II HARQ codebook). In some aspects, for example, the UE 405 may use the dynamic HARQ-ACK codebook based at least in part on receiving an RRC parameter value pdsch-HARQ-ACK-Codebook=dynamic. The DCI format of the DCI transmission may include a downlink assignment indicator such as a downlink assignment index (DAI) field, and the UE 405 may determine an ACK/NACK location in the dynamic HARQ-ACK codebook for the HARQ-ACK feedback in response to the TCI indication in the DCI transmission based at least in part on the DAI value or values indicated in the DCI. The DAI values may include a counter DAI value. In some aspects, the DAI values may include a counter DAI value and a total DAI value.

In some aspects, the UE 405 may transmit the HARQ-ACK feedback using a static HARQ-ACK codebook. In some aspects, the UE 405 may determine that the SPS PDSCH configuration is activated and may determine the location in the static HARQ-ACK codebook for the HARQ-ACK feedback based at least in part on an SPS PDSCH occasion corresponding to the SPS PDSCH configuration. In some aspects, the UE 405 may determine that the SPS PDSCH configuration is not activated and may determine the location in the static HARQ-ACK codebook for the HARQ-ACK feedback based at least in part on a most recently activated SPS PDSCH occasion. The most recently activated SPS PDSCH occasion may include an only SPS PDSCH occasion configured in a serving cell of the UE. In some aspects, the UE 405 may identify a plurality of configured SPS PDSCH occasions. The most recently activated SPS PDSCH occasion may be associated with a HARQ identifier indicated in the DCI transmission.

In some aspects, the UE 405 may determine the location in the static HARQ-ACK codebook for the HARQ-ACK feedback based at least in part on a default PDSCH occasion. The default PDSCH occasion may be based at least in part on a PDSCH occasion index. For example, the PDSCH occasion index may be a lowest PDSCH occasion index.

In some aspects, the base station 410 may transmit, and the UE 405 may receive, an additional DCI transmission that indicates an additional unified TCI. The additional DCI transmission may include an additional SPS-release DCI transmission releasing an SPS PDSCH configuration. The additional DCI transmission may be associated with a location in the static HARQ-ACK codebook with which the DCI transmission is associated. The UE 405 may identify the additional DCI transmission as an error based at least in part on determining that the additional DCI transmission is associated with the location in the static HARQ-ACK codebook with which the DCI transmission is associated.

In some aspects, the SPS PDSCH configuration may correspond to a set of SPS PDSCH occasions. The base station 410 may transmit, and the UE 405 may receive, at least one additional DCI transmission that indicates at least one additional unified TCI. The at least one additional DCI transmission may include at least one additional SPS-release DCI transmission releasing the SPS PDSCH configuration. The UE 405 may determine that a number of SPS PDSCH occasions in the set of SPS PDSCH occasions is greater than, or equal to, a number of unified TCIs in a set of unified TCIs that includes the unified TCI and the at least one additional unified TCI.

In some aspects, the UE 405 may determine the location in the static HARQ-ACK codebook for the HARQ-ACK feedback based at least in part on a plurality of locations associated with a plurality of SPS PDSCH occasions of the set of SPS PDSCH occasions. Each of a plurality of SPS configuration indexes of the plurality of SPS PDSCH occasions may be lower than a configuration index of any SPS PDSCH occasion of the set of SPS PDSCH occasions that is not also in the plurality of SPS PDSCH occasions.

In some aspects, the SPS PDSCH configuration may correspond to a set of SPS PDSCH occasions, and the UE 405 may receive at least one additional SPS release DCI transmission that indicates at least one additional unified TCI, wherein the at least one additional DCI transmission comprises at least one additional SPS-release DCI transmission releasing the SPS PDSCH configuration. The UE 405 may determine that a number, M, of SPS PDSCH occasions in the set of SPS PDSCH occasions is less than a number, N, of unified TCIs in a set of unified TCIs that includes the unified TCI and the at least one additional unified TCI.

The UE 405 may determine that a HARQ-ACK codebook DCI field includes a semi-static indication and may determine the location in the static HARQ-ACK codebook for the HARQ-ACK feedback based at least in part on a plurality of locations associated with a plurality of SPS PDSCH occasions of the set of SPS PDSCH occasions. Each of a plurality of SPS configuration indexes of the plurality of SPS PDSCH occasions may be lower than a configuration index of any SPS PDSCH occasion of the set of SPS PDSCH occasions that is not also in the plurality of SPS PDSCH occasions.

The UE 405 may determine that a number of DCI transmissions of a set of DCI transmissions that include the DCI transmission and the at least one additional DCI transmission is greater than the number of SPS PDSCH occasions in the set of SPS PDSCH occasions by at least one excess DCI transmission. The UE 405 may determine the location in the static HARQ-ACK codebook for the HARQ-ACK feedback based at least in part on a default PDSCH occasion.

In some aspects, the UE 405 may determine the location in the static HARQ-ACK codebook for the HARQ-ACK feedback by appending one or more dedicated bits to the static HARQ-ACK codebook. A dedicated bit of the one or more dedicated bits may be associated with the SPS PDSCH configuration. In some aspects, the UE 405 may receive at least one additional DCI transmission that indicates at least one additional unified TCI, where the at least one additional DCI transmission comprises at least one additional SPS-release DCI transmission. The UE 405 may determine a location in the static HARQ-ACK codebook for an additional HARQ-ACK feedback corresponding to the at least one additional DCI transmission based at least in part on at least one additional dedicated bit of the one or more dedicated bits being associated with the at least one additional DCI transmission, where the dedicated bit and the at least one additional dedicated bits are different.

As indicated above, FIG. 4 is provided as an example. Other examples may differ from what is described with regard to FIG. 4.

Figure 5:
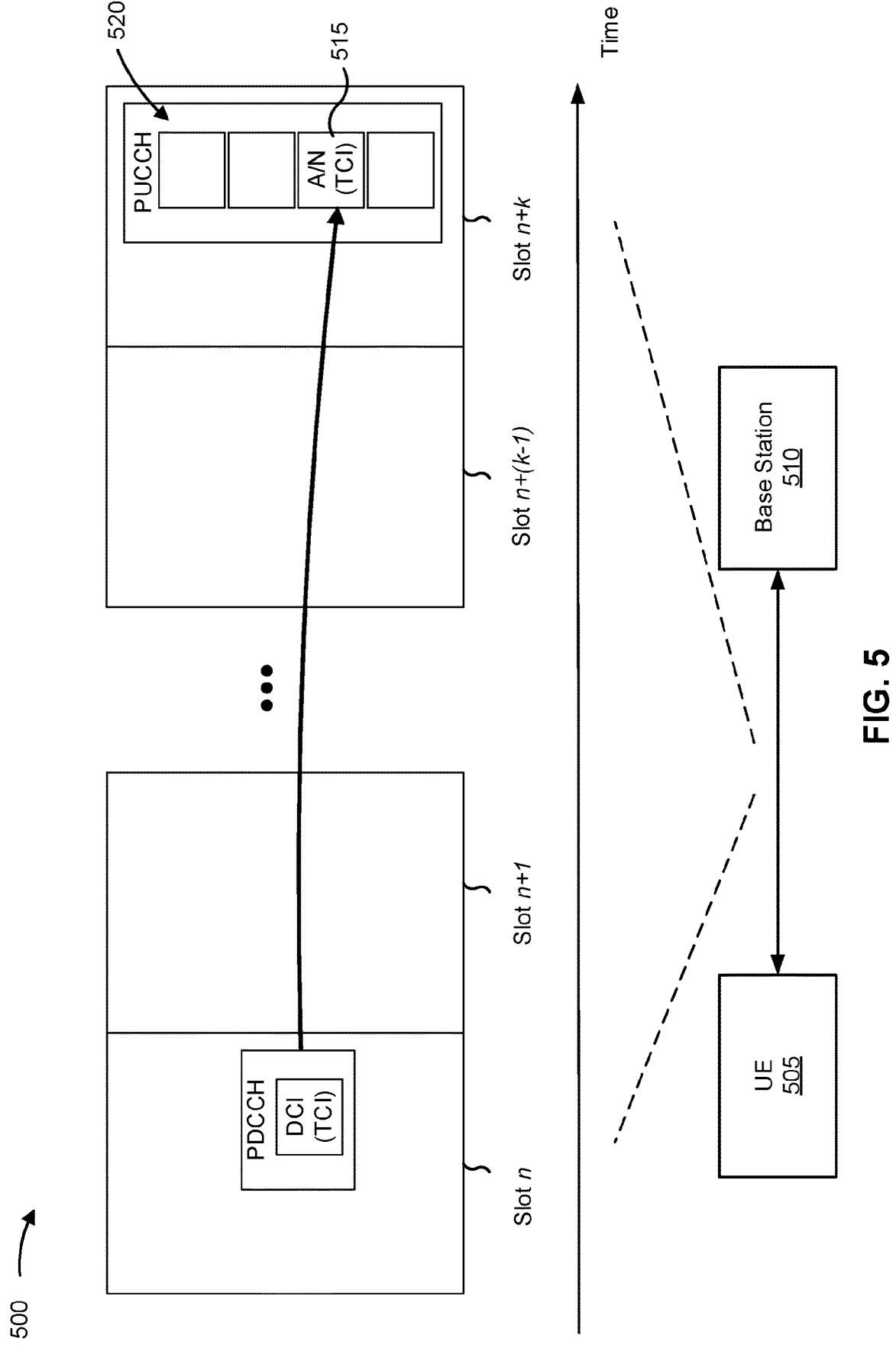

FIG. 5 is a diagram illustrating an example 500 associated with feedback corresponding to unified TCIs in SPS release DCI transmissions, in accordance with the present disclosure. As shown, a UE 505 and a base station 510 may communicate with one another. In some aspects, the UE 505 may be, or be similar to, the UE 405 shown in FIG. 4. The base station 510 may be, or be similar to, the base station 410 shown in FIG. 4.

As shown, the UE 505 may receive, from the base station 510, a DCI transmission that indicates a unified TCI (shown as "DCI (TCI)") associated with a PDCCH in a slot n. The UE 505 may transmit HARQ-ACK feedback that indicates an ACK or a NACK (shown as "A/N") using one or more PUCCH resources 515 of a set 520 of PUCCH resources in a slot n+k. The slot n+k and/or the one or more PUCCH resources 515 may be determined as described above, in connection with FIG. 4.

For example, in some aspects, the DCI transmission for beam indication (e.g., a unified TCI indication) may include a DCI format 1_1 or 1_2. Upon a successful reception of the beam indication DCI, the UE 505 may report an ACK to the base station, and upon a failed reception of the beam indication DCI, the UE 505 may report a NACK to the base station.

The one or more PUCCH resources 515 may be used to transmit a HARQ-ACK codebook of multiple ACK/NACK bits, including at least one of the ACK/NACK bits for the HARQ feedback corresponding to the beam indication in the SPS release DCI transmission. The HARQ-ACK codebook may be configured as a type 1 HARQ-ACK codebook (e.g., by an RRC parameter pdsch-HARQ-ACK-Codebook=static) or a type 2 HARQ-ACK codebook (e.g., by an RRC parameter pdsch-HARQ-ACK-Codebook=dynamic). In some aspects, the ACK/NACK information in response to the beam indication in the DCI transmission may be transmitted in a PUCCH k slots after the end of the PDCCH reception for the DCI where k is indicated by the PDSCH-to-HARQ_feedback timing indicator field in the DCI format, or provided dl-DataToUL-ACK (or dl-DataToUL-ACK-ForDCI-Format1-2-r16) if the PDSCH-to-HARQ_feedback timing indicator field is not present in the DCI.

As indicated above, FIG. 5 is provided as an example. Other examples may differ from what is described with regard to FIG. 5.

Figure 6:
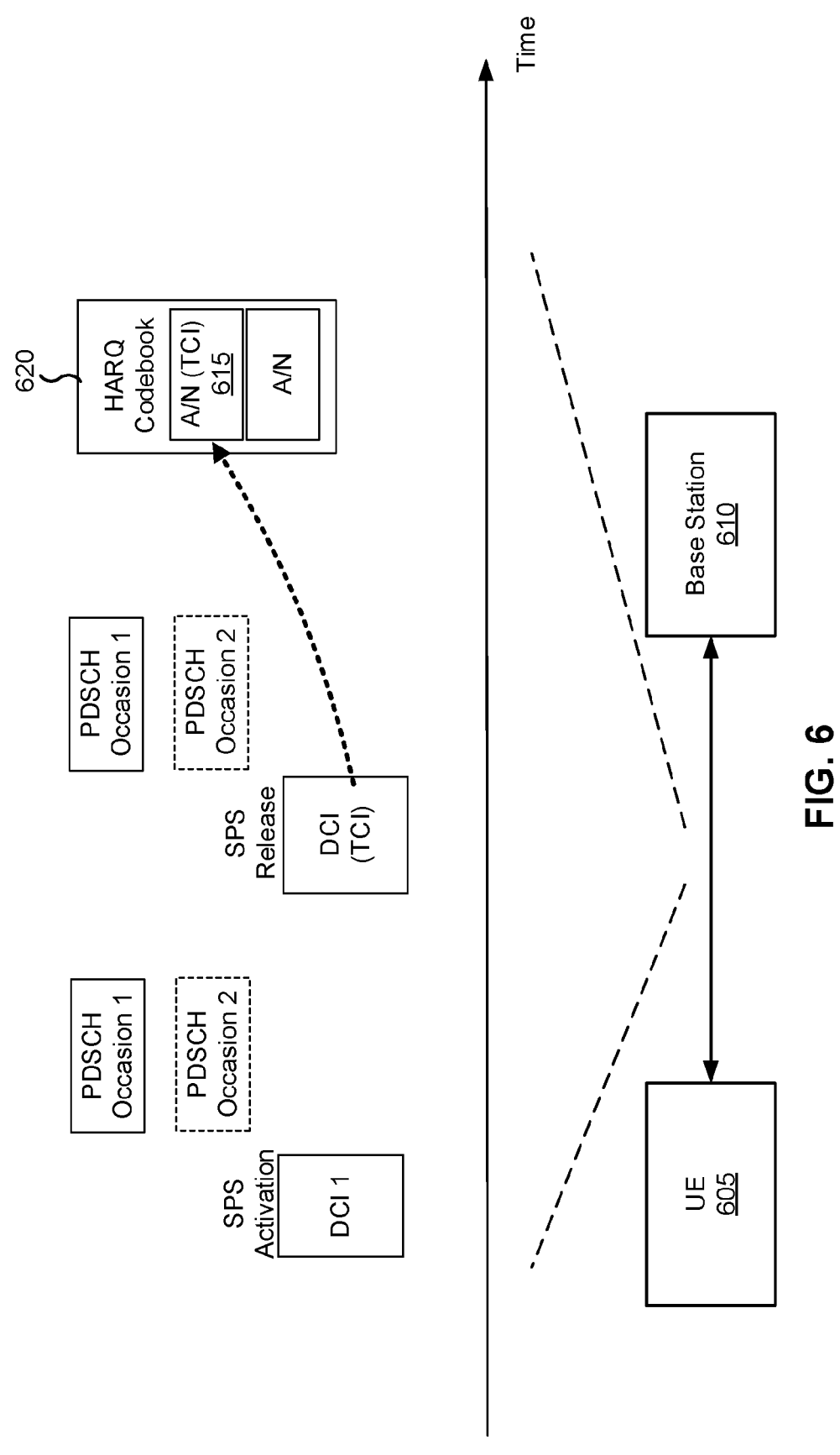

FIG. 6 is a diagram illustrating an example 600 associated with feedback corresponding to unified TCIs in SPS release DCI transmissions, in accordance with the present disclosure. As shown, a UE 605 and a base station 610 may communicate with one another. In some aspects, the UE 605 may be, or be similar to, the UE 405 shown in FIG. 4. The base station 610 may be, or be similar to, the base station 410 shown in FIG. 4.

As shown, the UE 605 may receive, from the base station 610, a first DCI transmission (shown as "DCI 1") that activates an SPS PDSCH occasion 1. The UE 605 may receive a second DCI transmission that indicates a unified TCI (shown as "DCI (TCI)") that releases the SPS PDSCH Occasion 1. The UE 605 may transmit HARQ-ACK feedback that indicates an ACK or a NACK corresponding to the TCI (shown as "A/N (TCI)") using a location 615 in a HARQ-ACK codebook (shown as "HARQ codebook") 620. For example, the location 615 may be determined to be the same location as for the corresponding SPS PDSCH Occasion 1, since the SPS PDSCH Occasion 1 is activated.

As indicated above, FIG. 6 is provided as an example. Other examples may differ from what is described with regard to FIG. 6.

Figure 7:
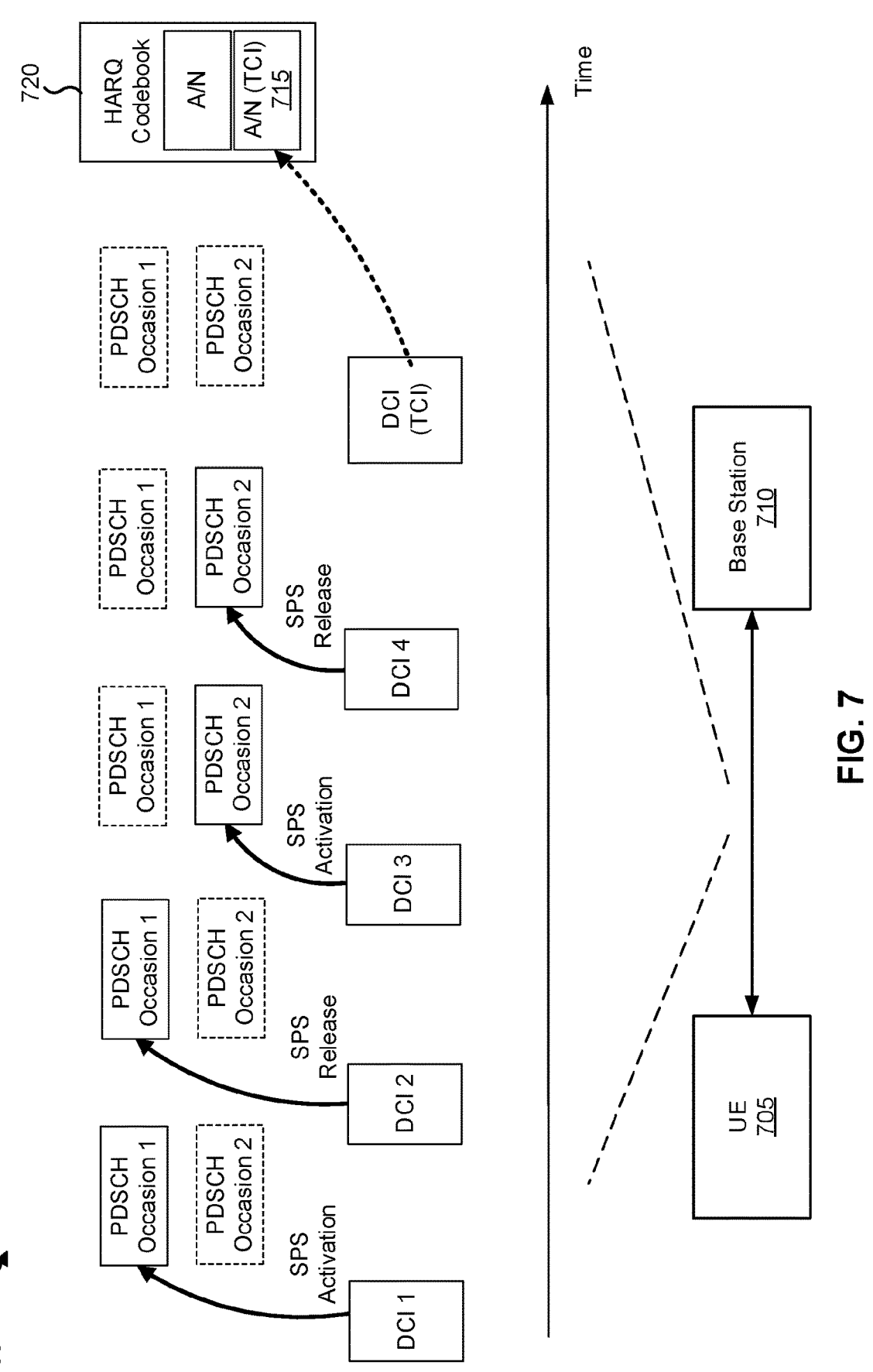

FIG. 7 is a diagram illustrating an example 700 associated with feedback corresponding to unified TCIs in SPS release DCI transmissions, in accordance with the present disclosure. As shown, a UE 705 and a base station 710 may communicate with one another. In some aspects, the UE 705 may be, or be similar to, the UE 405 shown in FIG. 4. The base station 710 may be, or be similar to, the base station 410 shown in FIG. 4.

As shown, the UE 705 may receive, from the base station 710, a first DCI transmission (shown as "DCI 1") that activates an SPS PDSCH occasion 1 and a second DCI transmission (shown as "DCI 2") that releases the SPS PDSCH Occasion 1. The UE 705 may receive a third DCI transmission (shown as "DCI 3") that activates an SPS PDSCH Occasion 2 and a fourth DCI transmission (shown as "DCI 4") that releases the SPS PDSCH Occasion 2. The UE 705 may receive a DCI transmission that indicates a unified TCI (shown as "DCI (TCI)") and that releases an SPS PDSCH Occasion, even though neither SPS PDSCH Occasion 1 nor SPS PDSCH Occasion 2 is activated.

The UE 705 may transmit HARQ-ACK feedback that indicates an ACK or a NACK corresponding to the TCI (shown as "A/N (TCI)") using a location 715 in a HARQ-ACK codebook (shown as "HARQ codebook") 720. For example, the location 715 may be determined to be the same location as for the corresponding most recent activated SPS PDSCH Occasion, which, in the illustrated examples, is the SPS PDSCH Occasion 2. In some aspects, the corresponding SPS PDSCH may be the only SPS PDSCH configured in the serving cell or the SPS configured associated with the indicated HARQ ID of the DCI(TCI) if multiple SPSs are configured.

In some aspects, the location 715 may correspond to a default PDSCH occasion. For example, in some aspects, the default PDSCH occasion may be based on a PDSCH occasion index (e.g., a lowest PDSCH occasion index). In some aspects, the default PDSCH occasion may be preconfigured (e.g., via RRC signaling, a dummy SPS activation DCI, a PDSCH occasion, and/or a TDRA).

As indicated above, FIG. 7 is provided as an example. Other examples may differ from what is described with regard to FIG. 7.

Figure 8:
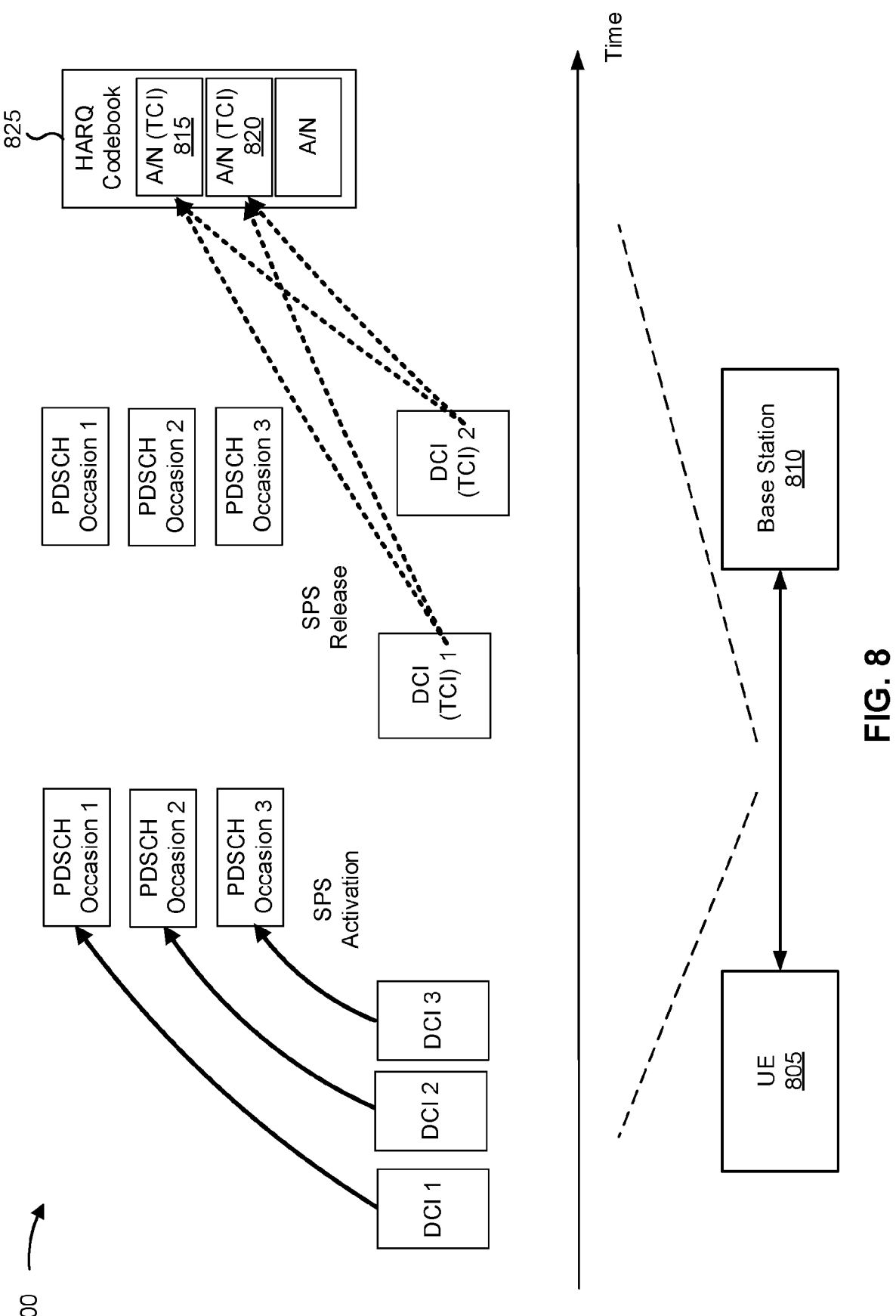

FIG. 8 is a diagram illustrating an example 800 associated with feedback corresponding to unified TCIs in SPS release DCI transmissions, in accordance with the present disclosure. As shown, a UE 805 and a base station 810 may communicate with one another. In some aspects, the UE 805 may be, or be similar to, the UE 405 shown in FIG. 4. The base station 810 may be, or be similar to, the base station 410 shown in FIG. 4.

As shown, the UE 805 may receive, from the base station 810, a first DCI transmission (shown as "DCI 1") that activates an SPS PDSCH Occasion 1, a second DCI transmission (shown as "DCI 2") that activates an SPS PDSCH Occasion 2, and a third DCI transmission (shown as "DCI 3") that activates an SPS PDSCH Occasion 3. The UE 805 may receive a first DCI transmission that indicates a unified TCI (shown as "DCI (TCI) 1") and that releases an SPS PDSCH Occasion, and a second DCI transmission that indicates a unified TCI (shown as "DCI (TCI) 2") and that releases an SPS PDSCH Occasion.

The UE 805 may determine that the UE 805 received unified TCI indications by a number N DCI transmissions (in the illustrated example, N=2), where each of N DCI transmissions is validated as an SPS release DCI releasing a same set of M SPS PDSCH configurations (in the illustrated example, M=2 or 3). The UE 805 may determine that, because M is greater than or equal to N, the locations 815 and 820 in the Type-1 HARQ-ACK codebook 825 for HARQ-ACK information corresponding to the unified TCIs in the DCI transmissions are the same as for the corresponding SPS PDSCH reception occasions with the lowest N SPS configuration indexes among the multiple SPS PDSCH releases.

As indicated above, FIG. 8 is provided as an example. Other examples may differ from what is described with regard to FIG. 8.

FIG. 9 is a diagram illustrating an example process 900 performed, for example, by a UE, in accordance with the present disclosure. Example process 900 is an example where the UE (e.g., UE 405) performs operations associated with feedback corresponding to unified TCIs in SPS release DCI transmissions.

As shown in FIG. 9, in some aspects, process 900 may include receiving a DCI transmission that indicates a unified TCI, wherein the DCI transmission comprises an SPS release DCI transmission releasing an SPS PDSCH configuration (block 910). For example, the UE (e.g., using reception component 1102, depicted in FIG. 11) may receive a DCI transmission that indicates a unified TCI, wherein the DCI transmission comprises an SPS release DCI transmission releasing an SPS PDSCH configuration, as described above in connection with FIGS. 4-8.

As further shown in FIG. 9, in some aspects, process 900 may include transmitting HARQ-ACK feedback using a HARQ-ACK codebook, wherein the HARQ-ACK feedback comprises an ACK to indicate successful reception of the unified TCI in the DCI transmission or a NACK to indicate a failed reception of the unified TCI in the DCI transmission (block 920). For example, the UE (e.g., using transmission component 1104, depicted in FIG. 11) may transmit HARQ-ACK feedback using a HARQ-ACK codebook, wherein the HARQ-ACK feedback comprises an ACK to indicate successful reception of the unified TCI in the DCI transmission or a NACK to indicate a failed reception of the unified TCI in the DCI transmission, as described above in connection with FIGS. 4-8.

Process 900 may include additional aspects, such as any single aspect or any combination of aspects described below and/or in connection with one or more other processes described elsewhere herein.

In a first aspect, transmitting the HARQ feedback comprises transmitting the HARQ feedback using a static HARQ-ACK codebook based at least in part on a determination of a location in the static HARQ-ACK codebook for the HARQ-ACK feedback.

In a second aspect, alone or in combination with the first aspect, process 900 includes determining that the SPS PDSCH configuration is activated, wherein determining the location in the static HARQ-ACK codebook for the HARQ-ACK feedback includes determining the location in the static HARQ-ACK codebook for the HARQ-ACK feedback based at least in part on an SPS PDSCH occasion corresponding to the SPS PDSCH configuration.

In a third aspect, alone or in combination with one or more of the first and second aspects, process 900 includes determining that the SPS PDSCH configuration is not activated, wherein determining the location in the static HARQ-ACK codebook for the HARQ-ACK feedback comprises determining the location in the static HARQ-ACK codebook for the HARQ-ACK feedback based at least in part on a most recently activated SPS PDSCH occasion.

In a fourth aspect, alone or in combination with one or more of the first through third aspects, the most recently activated SPS PDSCH occasion comprises an only SPS PDSCH occasion configured in a serving cell of the UE.

In a fifth aspect, alone or in combination with one or more of the first through fourth aspects, process 900 includes identifying a plurality of configured SPS PDSCH occasions, wherein the most recently activated SPS PDSCH occasion is associated with a HARQ identifier indicated in the DCI transmission.

In a sixth aspect, alone or in combination with one or more of the first through fifth aspects, determining the location in the static HARQ-ACK codebook for the HARQ-ACK feedback comprises determining the location in the static HARQ-ACK codebook for the HARQ-ACK feedback based at least in part on a default PDSCH occasion.

In a seventh aspect, alone or in combination with one or more of the first through sixth aspects, the default PDSCH occasion is based at least in part on a PDSCH occasion index.

In an eighth aspect, alone or in combination with one or more of the first through seventh aspects, the PDSCH occasion index comprises a lowest PDSCH occasion index.

In a ninth aspect, alone or in combination with one or more of the first through eighth aspects, process 900 includes receiving a default PDSCH occasion configuration that configures the default PDSCH occasion.

In a tenth aspect, alone or in combination with one or more of the first through ninth aspects, receiving the default PDSCH occasion configuration comprises receiving at least one of a radio resource control message, a dummy SPS activation DCI transmission, a PDSCH occasion indication, or a time domain resource assignment.

In an eleventh aspect, alone or in combination with one or more of the first through tenth aspects, process 900 includes receiving an additional DCI transmission that indicates an additional unified TCI, wherein the additional DCI transmission comprises an additional SPS-release DCI transmission releasing an the SPS PDSCH configuration, determining that the additional DCI transmission is associated with a location in the static HARQ-ACK codebook with which the DCI transmission is associated, and identifying the additional DCI transmission as an error based at least in part on determining that the additional DCI transmission is associated with the location in the static HARQ-ACK codebook with which the DCI transmission is associated.

In a twelfth aspect, alone or in combination with one or more of the first through eleventh aspects, the SPS PDSCH configuration corresponds to a set of SPS PDSCH occasions, the method further comprising receiving at least one additional DCI transmission that indicates at least one additional unified TCI, wherein the at least one additional DCI transmission comprises at least one additional SPS-release DCI transmission releasing the SPS PDSCH configuration, and determining that a number of SPS PDSCH occasions in the set of SPS PDSCH occasions is greater than, or equal to, a number of unified TCIs in a set of unified TCIs that includes the unified TCI and the at least one additional unified TCI, wherein determining the location in the static HARQ-ACK codebook for the HARQ-ACK feedback comprises determining the location in the static HARQ-ACK codebook for the HARQ-ACK feedback based at least in part on a plurality of locations associated with a plurality of SPS PDSCH occasions of the set of SPS PDSCH occasions, wherein each of a plurality of SPS configuration indexes of the plurality of SPS PDSCH occasions is lower than a configuration index of any SPS PDSCH occasion of the set of SPS PDSCH occasions that is not also in the plurality of SPS PDSCH occasions.

In a thirteenth aspect, alone or in combination with one or more of the first through twelfth aspects, the SPS PDSCH configuration corresponds to a set of SPS PDSCH occasions, the method further comprising receiving at least one additional DCI transmission that indicates at least one additional unified TCI, wherein the at least one additional DCI transmission comprises at least one additional SPS-release DCI transmission releasing the SPS PDSCH configuration, determining that a number of SPS PDSCH occasions in the set of SPS PDSCH occasions is less than a number of unified TCIs in a set of unified TCIs that includes the unified TCI and the at least one additional unified TCI, and determining that a HARQ-ACK codebook DCI field includes a semi-static indication, wherein determining the location in the static HARQ-ACK codebook for the HARQ-ACK feedback comprises determining the location in the static HARQ-ACK codebook for the HARQ-ACK feedback based at least in part on a plurality of locations associated with a plurality of SPS PDSCH occasions of the set of SPS PDSCH occasions, wherein each of a plurality of SPS configuration indexes of the plurality of SPS PDSCH occasions is lower than a configuration index of any SPS PDSCH occasion of the set of SPS PDSCH occasions that is not also in the plurality of SPS PDSCH occasions.

In a fourteenth aspect, alone or in combination with one or more of the first through thirteenth aspects, process 900 includes determining that a number of DCI transmissions of a set of DCI transmissions that include the DCI transmission and the at least one additional DCI transmission is greater than the number of SPS PDSCH occasions in the set of SPS PDSCH occasions by at least one excess DCI transmission, wherein determining the location in the static HARQ-ACK codebook for the HARQ-ACK feedback comprises determining the location in the static HARQ-ACK codebook for the HARQ-ACK feedback associated with the at least one excess DCI transmission based at least in part on a default PDSCH occasion.

In a fifteenth aspect, alone or in combination with one or more of the first through fourteenth aspects, determining the location in the static HARQ-ACK codebook for the HARQ-ACK feedback comprises appending one or more dedicated bits to the static HARQ-ACK codebook.

In a sixteenth aspect, alone or in combination with one or more of the first through fifteenth aspects, a dedicated bit of the one or more dedicated bits is associated with the SPS PDSCH configuration.

In a seventeenth aspect, alone or in combination with one or more of the first through sixteenth aspects, process 900 includes receiving at least one additional DCI transmission that indicates at least one additional unified TCI, wherein the at least one additional DCI transmission comprises at least one additional SPS-release DCI transmission, and determining a location in the static HARQ-ACK codebook for an additional HARQ-ACK feedback corresponding to the at least one additional DCI transmission based at least in part on at least one additional dedicated bit of the one or more dedicated bits being associated with the at least one additional DCI transmission, wherein the dedicated bit and the at least one additional dedicated bits are different.

In an eighteenth aspect, alone or in combination with one or more of the first through seventeenth aspects, transmitting the HARQ feedback comprises transmitting the HARQ feedback using a dynamic HARQ-ACK codebook, and wherein the method further comprises determining a location in the dynamic HARQ-ACK codebook for the HARQ-ACK feedback.

In a nineteenth aspect, alone or in combination with one or more of the first through eighteenth aspects, determining the location in the dynamic HARQ-ACK codebook for the HARQ-ACK feedback comprises determining the location in the dynamic HARQ-ACK codebook for the HARQ-ACK feedback based at least in part on a downlink assignment indicator indicated in the DCI transmission.

In a twentieth aspect, alone or in combination with one or more of the first through nineteenth aspects, receiving the DCI transmission comprises receiving the DCI transmission in a first slot, and wherein transmitting the HARQ-ACK feedback comprises transmitting the HARQ-ACK feedback using a PUCCH transmission in a second slot, wherein the second slot is separated from the first slot by a number of slots indicated by a value of a slot parameter.

In a twenty-first aspect, alone or in combination with one or more of the first through twentieth aspects, the DCI transmission comprises a PDSCH-to-HARQ feedback timing indicator field, and wherein the PDSCH-to-HARQ feedback timing indicator field indicates the value of the slot parameter.

In a twenty-second aspect, alone or in combination with one or more of the first through twenty-first aspects, the DCI transmission comprises a data-to-uplink timing indicator field, and wherein the data-to-uplink timing indicator field indicates the value of the slot parameter.

In a twenty-third aspect, alone or in combination with one or more of the first through twenty-second aspects, the value of the slot parameter is zero, and wherein the second slot comprises a last slot of the PUCCH transmission that overlaps with reception of the DCI transmission.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a base station, in accordance with the present disclosure. Example process 1000 is an example where the base station (e.g., base station 410) performs operations associated with feedback corresponding to unified TCIs in SPS release DCI transmissions.

As shown in FIG. 10, in some aspects, process 1000 may include transmitting a DCI transmission that indicates a unified TCI, wherein the DCI transmission comprises an SPS-release DCI transmission releasing an SPS PDSCH configuration (block 1010). For example, the base station (e.g., using transmission component 1204, depicted in FIG. 12) may transmit a DCI transmission that indicates a unified TCI, wherein the DCI transmission comprises an SPS release DCI transmission releasing an SPS PDSCH configuration, as described above in connection with FIGS. 4-8.

As further shown in FIG. 10, in some aspects, process 1000 may include receiving HARQ-ACK feedback using a HARQ-ACK codebook, wherein the HARQ-ACK feedback comprises an ACK to indicate successful reception of the unified TCI in the DCI transmission or a NACK to indicate a failed reception of the unified TCI in the DCI transmission (block 1020). For example, the base station (e.g., using reception component 1202, depicted in FIG. 12) may receive HARQ-ACK feedback using a HARQ-ACK codebook, wherein the HARQ-ACK feedback comprises an ACK to indicate successful reception of the unified TCI in the DCI transmission or a NACK to indicate a failed reception of the unified TCI in the DCI transmission, as described above in connection with FIGS. 4-8.

Process 1000 may include additional aspects, such as any single aspect or any combination of aspects described below and/or in connection with one or more other processes described elsewhere herein.

In a first aspect, receiving the HARQ feedback comprises receiving the HARQ feedback using a static HARQ-ACK codebook based at least in part on a determination of a location in the static HARQ-ACK codebook for the HARQ-ACK feedback.

In a second aspect, alone or in combination with the first aspect, the determination of the location in the static HARQ-ACK codebook for the HARQ-ACK feedback is based at least in part on an SPS PDSCH occasion corresponding to the SPS PDSCH configuration, wherein the SPS PDSCH configuration is activated.

In a third aspect, alone or in combination with one or more of the first and second aspects, the determination of the location in the static HARQ-ACK codebook for the HARQ-ACK feedback is based at least in part on a most recently activated SPS PDSCH occasion, wherein the SPS PDSCH configuration is not activated.

In a fourth aspect, alone or in combination with one or more of the first through third aspects, the most recently activated SPS PDSCH occasion comprises an only SPS PDSCH occasion configured in a serving cell of the UE.

In a fifth aspect, alone or in combination with one or more of the first through fourth aspects, a most recently activated SPS PDSCH occasion is associated with a HARQ identifier indicated in the DCI transmission.

In a sixth aspect, alone or in combination with one or more of the first through fifth aspects, the location in the static HARQ-ACK codebook for the HARQ-ACK feedback is based at least in part on a default PDSCH occasion.

In a seventh aspect, alone or in combination with one or more of the first through sixth aspects, the default PDSCH occasion is based at least in part on a PDSCH occasion index.

In an eighth aspect, alone or in combination with one or more of the first through seventh aspects, the PDSCH occasion index comprises a lowest PDSCH occasion index.

In a ninth aspect, alone or in combination with one or more of the first through eighth aspects, process 1000 includes transmitting a default PDSCH occasion configuration that configures the default PDSCH occasion.

In a tenth aspect, alone or in combination with one or more of the first through ninth aspects, transmitting the default PDSCH occasion configuration comprises transmitting at least one of a radio resource control message, a dummy SPS activation DCI transmission, a PDSCH occasion indication, or a time domain resource assignment.

In an eleventh aspect, alone or in combination with one or more of the first through tenth aspects, process 1000 includes transmitting an additional DCI transmission that indicates an additional unified TCI, wherein the additional DCI transmission comprises an additional SPS-release DCI transmission releasing an the SPS PDSCH configuration, wherein the additional DCI transmission is associated with a location in the static HARQ-ACK codebook with which the DCI transmission is associated, and wherein the additional DCI transmission comprises an error based at least in part on a determination that the additional DCI transmission is associated with the location in the static HARQ-ACK codebook with which the DCI transmission is associated.

In a twelfth aspect, alone or in combination with one or more of the first through eleventh aspects, the SPS PDSCH configuration corresponds to a set of SPS PDSCH occasions, the method further comprising transmitting at least one additional DCI transmission that indicates at least one additional unified TCI, wherein the at least one additional DCI transmission comprises at least one additional SPS-release DCI transmission releasing the SPS PDSCH configuration, and wherein a number of SPS PDSCH occasions in the set of SPS PDSCH occasions is greater than, or equal to, a number of unified TCIs in a set of unified TCIs that includes the unified TCI and the at least one additional unified TCI, and wherein the location in the static HARQ-ACK codebook for the HARQ-ACK feedback is based at least in part on a plurality of locations associated with a plurality of SPS PDSCH occasions of the set of SPS PDSCH occasions, wherein each of a plurality of SPS configuration indexes of the plurality of SPS PDSCH occasions is lower than a configuration index of any SPS PDSCH occasion of the set of SPS PDSCH occasions that is not also in the plurality of SPS PDSCH occasions.

In a thirteenth aspect, alone or in combination with one or more of the first through twelfth aspects, the SPS PDSCH configuration corresponds to a set of SPS PDSCH occasions, the method further comprising transmitting at least one additional DCI transmission that indicates at least one additional unified TCI, wherein the at least one additional DCI transmission comprises at least one additional SPS-release DCI transmission releasing the SPS PDSCH configuration, wherein a number of SPS PDSCH occasions in the set of SPS PDSCH occasions is less than a number of unified TCIs in a set of unified TCIs that includes the unified TCI and the at least one additional unified TCI, wherein a HARQ-ACK codebook DCI field includes a semi-static indication, wherein the location in the static HARQ-ACK codebook for the HARQ-ACK feedback is based at least in part on a plurality of locations associated with a plurality of SPS PDSCH occasions of the set of SPS PDSCH occasions, wherein each of a plurality of SPS configuration indexes of the plurality of SPS PDSCH occasions is lower than a configuration index of any SPS PDSCH occasion of the set of SPS PDSCH occasions that is not also in the plurality of SPS PDSCH occasions.

In a fourteenth aspect, alone or in combination with one or more of the first through thirteenth aspects, a number of DCI transmissions of a set of DCI transmissions that include the DCI transmission and the at least one additional DCI transmission is greater than the number of SPS PDSCH occasions in the set of SPS PDSCH occasions by at least one excess DCI transmission, and wherein the location in the static HARQ-ACK codebook for the HARQ-ACK feedback comprises a location in the static HARQ-ACK codebook for the HARQ-ACK feedback associated with the at least one excess DCI transmission based at least in part on a default PDSCH occasion.

In a fifteenth aspect, alone or in combination with one or more of the first through fourteenth aspects, the location in the static HARQ-ACK codebook for the HARQ-ACK feedback comprises one or more dedicated bits appended to the static HARQ-ACK codebook.

In a sixteenth aspect, alone or in combination with one or more of the first through fifteenth aspects, a dedicated bit of the one or more dedicated bits is associated with the SPS PDSCH configuration.

In a seventeenth aspect, alone or in combination with one or more of the first through sixteenth aspects, process 1000 includes transmitting at least one additional DCI transmission that indicates at least one additional unified TCI, wherein the at least one additional DCI transmission comprises at least one additional SPS-release DCI transmission, wherein a location in the static HARQ-ACK codebook for an additional HARQ-ACK feedback corresponding to the at least one additional DCI transmission is based at least in part on at least one additional dedicated bit of the one or more dedicated bits being associated with the at least one additional DCI transmission, wherein the dedicated bit and the at least one additional dedicated bits are different.

In an eighteenth aspect, alone or in combination with one or more of the first through seventeenth aspects, receiving the HARQ feedback comprises receiving the HARQ feedback using a dynamic HARQ-ACK codebook, and wherein a location in the dynamic HARQ-ACK codebook contains the HARQ-ACK feedback.

In a nineteenth aspect, alone or in combination with one or more of the first through eighteenth aspects, the location in the dynamic HARQ-ACK codebook for the HARQ-ACK feedback is based at least in part on a downlink assignment indicator indicated in the DCI transmission.

In a twentieth aspect, alone or in combination with one or more of the first through nineteenth aspects, transmitting the DCI transmission comprises transmitting the DCI transmission in a first slot, and wherein receiving the HARQ-ACK feedback comprises receiving the HARQ-ACK feedback using a PUCCH transmission in a second slot, wherein the second slot is separated from the first slot by a number of slots indicated by a value of a slot parameter.

In a twenty-first aspect, alone or in combination with one or more of the first through twentieth aspects, the DCI transmission comprises a PDSCH-to-HARQ feedback timing indicator field, and wherein the PDSCH-to-HARQ feedback timing indicator field indicates the value of the slot parameter.

In a twenty-second aspect, alone or in combination with one or more of the first through twenty-first aspects, the DCI transmission comprises a data-to-uplink timing indicator field, and wherein the data-to-uplink timing indicator field indicates the value of the slot parameter.

In a twenty-third aspect, alone or in combination with one or more of the first through twenty-second aspects, the value of the slot parameter is zero, and wherein the second slot comprises a last slot of the PUCCH transmission that overlaps with reception of the DCI transmission.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
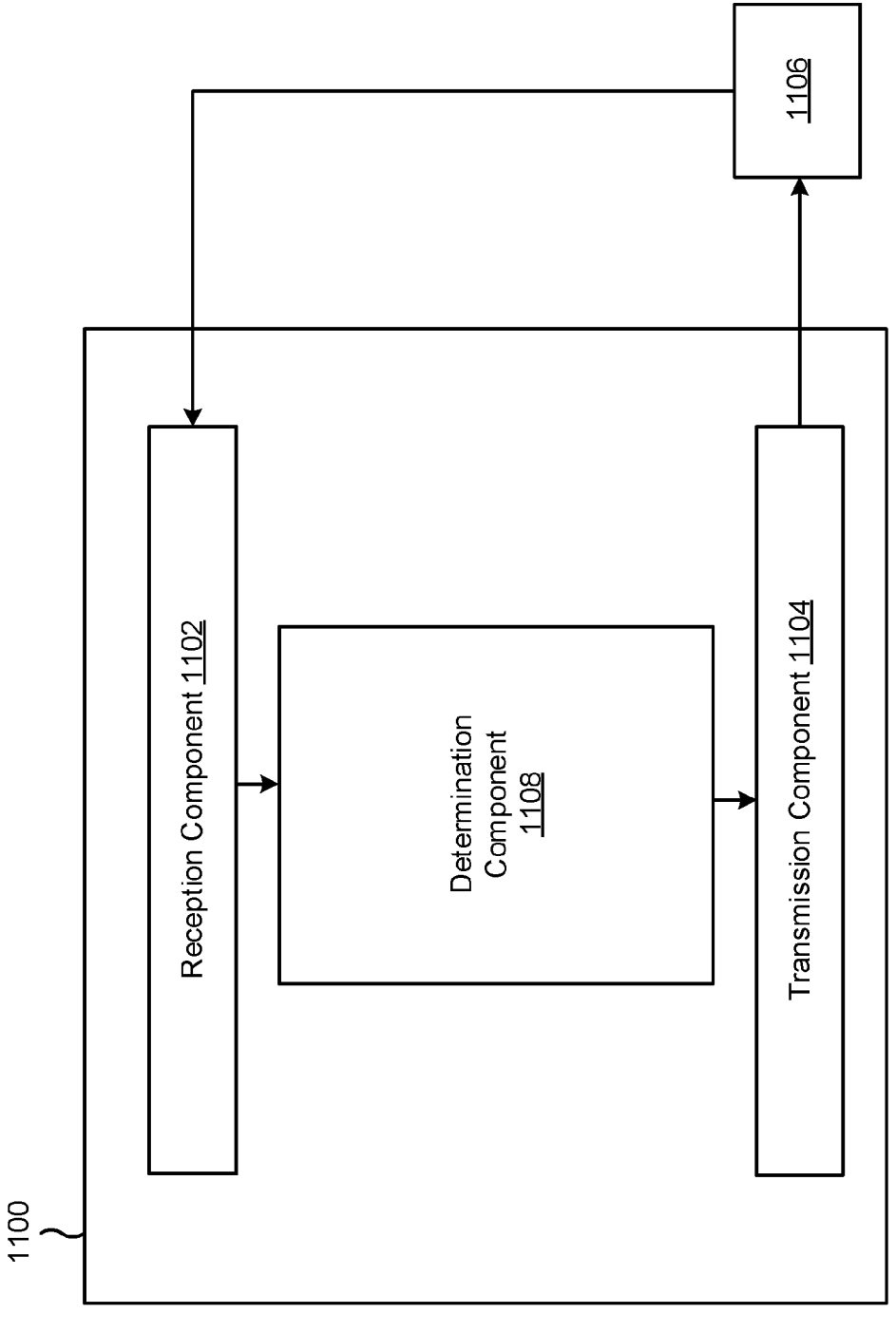
FIGS. 11 and 12 are block diagrams of example apparatuses for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108.

In some aspects, the apparatus 1100 may be configured to perform one or more operations described herein in connection with FIGS. 4-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The reception component 1102 may receive a DCI transmission that indicates a unified TCI, wherein the DCI transmission comprises an SPS release DCI transmission releasing an SPS PDSCH configuration. The transmission component 1104 may transmit HARQ-ACK feedback using a HARQ-ACK codebook, wherein the HARQ-ACK feedback comprises an ACK to indicate successful reception of the unified TCI in the DCI transmission or a NACK to indicate a failed reception of the unified TCI in the DCI transmission.

The determination component 1108 may determine that the SPS PDSCH configuration is activated wherein determining the location in the static HARQ-ACK codebook for the HARQ-ACK feedback comprises determining the location in the static HARQ-ACK codebook for the HARQ-ACK feedback based at least in part on an SPS PDSCH occasion corresponding to the SPS PDSCH configuration. In some aspects, the determination component 1108 may include one or more antennas, a modulator, a transmit MIMO processor, a transmit processor, a controller/processor, a memory, or a combination thereof, of the UE described above in connection with FIG. 2. In some aspects, the determination component 1108 may include the reception component 1102 and/or the transmission component 1104.

The determination component 1108 may determine that the SPS PDSCH configuration is not activated wherein determining the location in the static HARQ-ACK codebook for the HARQ-ACK feedback comprises determining the location in the static HARQ-ACK codebook for the HARQ-ACK feedback based at least in part on a most recently activated SPS PDSCH occasion.

The determination component 1108 may identify a plurality of configured SPS PDSCH occasions, wherein the most recently activated SPS PDSCH occasion is associated with a HARQ identifier indicated in the DCI transmission. The reception component 1102 may receive a default PDSCH occasion configuration that configures the default PDSCH occasion. The reception component 1102 may receive an additional DCI transmission that indicates an additional unified TCI, wherein the additional DCI transmission comprises an additional SPS-release DCI transmission releasing an SPS PDSCH configuration.

The determination component 1108 may determine that the additional DCI transmission is associated with a location in the static HARQ-ACK codebook with which the DCI transmission is associated. The determination component 1108 may identify the additional DCI transmission as an error based at least in part on determining that the additional DCI transmission is associated with the location in the static HARQ-ACK codebook with which the DCI transmission is associated.

The determination component 1108 may determine that a number of DCI transmissions of a set of DCI transmissions that include the DCI transmission and the at least one additional DCI transmission is greater than the number of SPS PDSCH occasions in the set of SPS PDSCH occasions by at least one excess DCI transmission wherein determining the location in the static HARQ-ACK codebook for the HARQ-ACK feedback comprises determining the location in the static HARQ-ACK codebook for the HARQ-ACK feedback associated with the at least one excess DCI transmission based at least in part on a default PDSCH occasion.

The reception component 1102 may receive at least one additional DCI transmission that indicates at least one additional unified TCI, wherein the at least one additional DCI transmission comprises at least one additional SPS-release DCI transmission. The determination component 1108 may determine a location in the static HARQ-ACK codebook for an additional HARQ-ACK feedback corresponding to the at least one additional DCI transmission based at least in part on at least one additional dedicated bit of the one or more dedicated bits being associated with the at least one additional DCI transmission, wherein the dedicated bit and the at least one additional dedicated bits are different.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
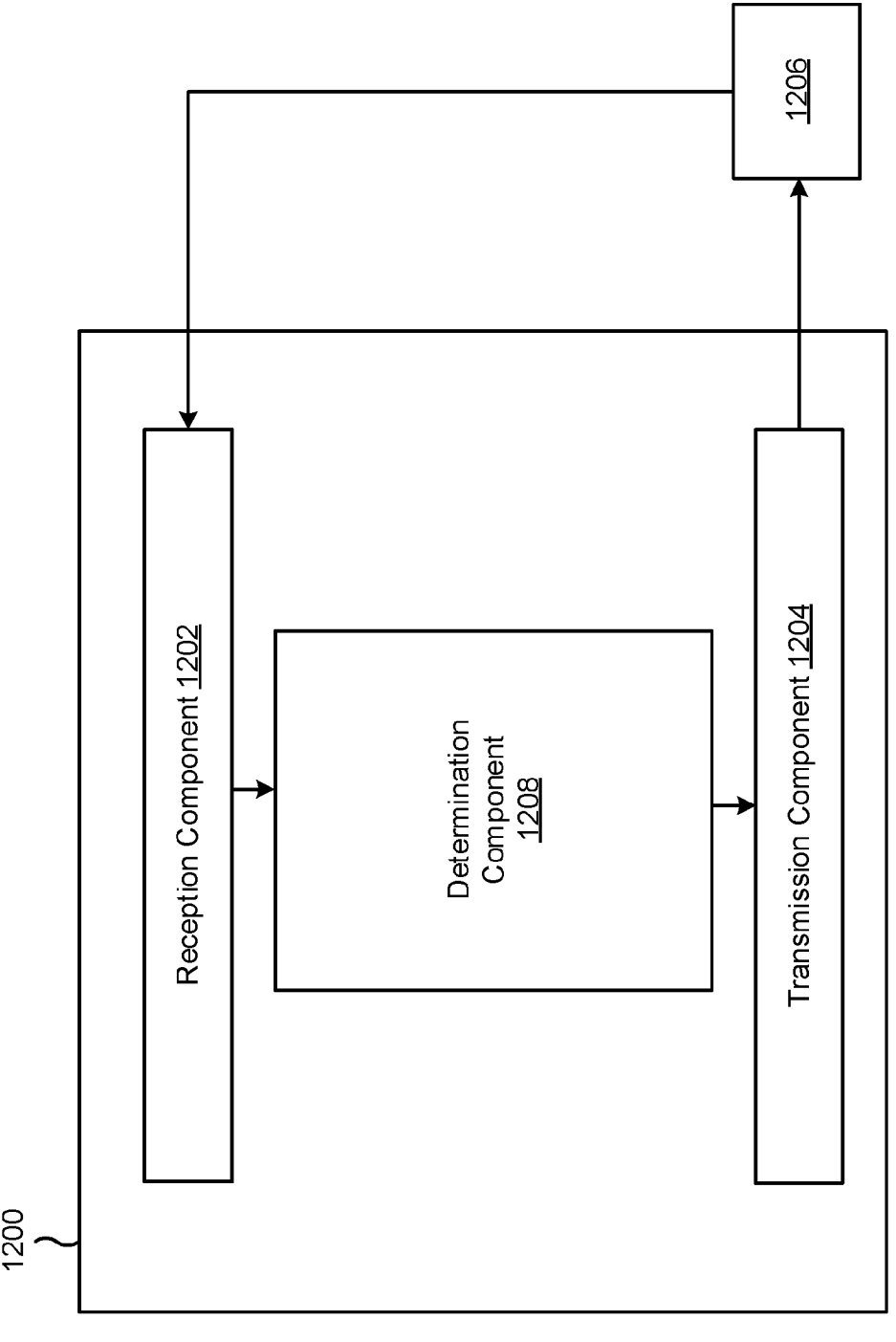

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component 1208.

In some aspects, the apparatus 1200 may be configured to perform one or more operations described herein in connection with FIGS. 4-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The transmission component 1204 may transmit a DCI transmission that indicates a unified TCI, wherein the DCI transmission comprises an SPS release DCI transmission releasing an SPS PDSCH configuration. The reception component 1202 may receive HARQ-ACK feedback using a HARQ-ACK codebook, wherein the HARQ-ACK feedback comprises an ACK to indicate successful reception of the unified TCI in the DCI transmission or a NACK to indicate a failed reception of the unified TCI in the DCI transmission. The transmission component 1204 may transmit a default PDSCH occasion configuration that configures a default PDSCH occasion.

The transmission component 1204 may transmit an additional DCI transmission that indicates an additional unified TCI, wherein the additional DCI transmission comprises an additional SPS-release DCI transmission releasing an the SPS PDSCH configuration wherein the additional DCI transmission is associated with a location in the static HARQ-ACK codebook with which the DCI transmission is associated.

The transmission component 1204 may transmit at least one additional DCI transmission that indicates at least one additional unified TCI, wherein the at least one additional DCI transmission comprises at least one additional SPS-release DCI transmission, wherein a location in the static HARQ-ACK codebook for an additional HARQ-ACK feedback corresponding to the at least one additional DCI transmission is based at least in part on at least one additional dedicated bit of the one or more dedicated bits being associated with the at least one additional DCI transmission, wherein the dedicated bit and the at least one additional dedicated bits are different.

The determination component 1208 may determine one or more SPS configurations, one or more HARQ-ACK configurations and/or one or more resource allocations, among other examples. In some aspects, the determination component 1208 may include one or more antennas, a modulator, a transmit MIMO processor, a transmit processor, a controller/processor, a memory, or a combination thereof, of the base station described above in connection with FIG. 2. In some aspects, the determination component 1208 may include the reception component 1202 and/or the transmission component 1204.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving a downlink control information (DCI) transmission that indicates a unified transmission configuration indicator (TCI), wherein the DCI transmission comprises a semi-persistent scheduling (SPS)-release DCI transmission releasing an SPS physical downlink shared channel (PDSCH) configuration; and transmitting hybrid automatic repeat request acknowledgement (HARQ-ACK) feedback using a HARQ-ACK codebook, wherein the HARQ-ACK feedback comprises an acknowledgment (ACK) to indicate successful reception of the unified TCI in the DCI transmission or a negative acknowledgement (NACK) to indicate a failed reception of the unified TCI in the DCI transmission.

Aspect 2: The method of Aspect 1, wherein transmitting the HARQ feedback comprises transmitting the HARQ feedback using a static HARQ-ACK codebook, and wherein the method further comprises determining a location in the static HARQ-ACK codebook for the HARQ-ACK feedback.

Aspect 3: The method of Aspect 2, further comprising determining that the SPS PDSCH configuration is activated, wherein determining the location in the static HARQ-ACK codebook for the HARQ-ACK feedback comprises determining the location in the static HARQ-ACK codebook for the HARQ-ACK feedback based at least in part on an SPS PDSCH occasion corresponding to the SPS PDSCH configuration.

Aspect 4: The method of Aspect 2, further comprising determining that the SPS PDSCH configuration is not activated, wherein determining the location in the static HARQ-ACK codebook for the HARQ-ACK feedback comprises determining the location in the static HARQ-ACK codebook for the HARQ-ACK feedback based at least in part on a most recently activated SPS PDSCH occasion.

Aspect 5: The method of Aspect 4, wherein the most recently activated SPS PDSCH occasion comprises an only SPS PDSCH occasion configured in a serving cell of the UE.

Aspect 6: The method of Aspect 4, further comprising identifying a plurality of configured SPS PDSCH occasions, wherein the most recently activated SPS PDSCH occasion is associated with a HARQ identifier indicated in the DCI transmission.

Aspect 7: The method of any of Aspects 2-6, wherein determining the location in the static HARQ-ACK codebook for the HARQ-ACK feedback comprises determining the location in the static HARQ-ACK codebook for the HARQ-ACK feedback based at least in part on a default PDSCH occasion.

Aspect 8: The method of Aspect 7, wherein the default PDSCH occasion is based at least in part on a PDSCH occasion index.

Aspect 9: The method of Aspect 8, wherein the PDSCH occasion index comprises a lowest PDSCH occasion index.

Aspect 10: The method of any of Aspects 7-9, further comprising receiving a default PDSCH occasion configuration that configures the default PDSCH occasion.

Aspect 11: The method of Aspect 10, wherein receiving the default PDSCH occasion configuration comprises receiving at least one of: a radio resource control message, a dummy SPS activation DCI transmission, a PDSCH occasion indication, or a time domain resource assignment.

Aspect 12: The method of any of Aspects 2-11, further comprising: receiving an additional DCI transmission that indicates an additional unified TCI, wherein the additional DCI transmission comprises an additional SPS-release DCI transmission releasing an the SPS PDSCH configuration; determining that the additional DCI transmission is associated with a location in the static HARQ-ACK codebook with which the DCI transmission is associated; and identifying the additional DCI transmission as an error based at least in part on determining that the additional DCI transmission is associated with the location in the static HARQ-ACK codebook with which the DCI transmission is associated.

Aspect 13: The method of any of Aspects 2-11, wherein the SPS PDSCH configuration corresponds to a set of SPS PDSCH occasions, the method further comprising: receiving at least one additional DCI transmission that indicates at least one additional unified TCI, wherein the at least one additional DCI transmission comprises at least one additional SPS-release DCI transmission releasing the SPS PDSCH configuration; and determining that a number of SPS PDSCH occasions in the set of SPS PDSCH occasions is greater than, or equal to, a number of unified TCIs in a set of unified TCIs that includes the unified TCI and the at least one additional unified TCI, wherein determining the location in the static HARQ-ACK codebook for the HARQ-ACK feedback comprises determining the location in the static HARQ-ACK codebook for the HARQ-ACK feedback based at least in part on a plurality of locations associated with a plurality of SPS PDSCH occasions of the set of SPS PDSCH occasions, wherein each of a plurality of SPS configuration indexes of the plurality of SPS PDSCH occasions is lower than a configuration index of any SPS PDSCH occasion of the set of SPS PDSCH occasions that is not also in the plurality of SPS PDSCH occasions.

Aspect 14: The method of any of Aspects 2-11, wherein the SPS PDSCH configuration corresponds to a set of SPS PDSCH occasions, the method further comprising: receiving at least one additional DCI transmission that indicates at least one additional unified TCI, wherein the at least one additional DCI transmission comprises at least one additional SPS-release DCI transmission releasing the SPS PDSCH configuration; determining that a number of SPS PDSCH occasions in the set of SPS PDSCH occasions is less than a number of unified TCIs in a set of unified TCIs that includes the unified TCI and the at least one additional unified TCI; and determining that a HARQ-ACK codebook DCI field includes a semi-static indication, wherein determining the location in the static HARQ-ACK codebook for the HARQ-ACK feedback comprises determining the location in the static HARQ-ACK codebook for the HARQ-ACK feedback based at least in part on a plurality of locations associated with a plurality of SPS PDSCH occasions of the set of SPS PDSCH occasions, wherein each of a plurality of SPS configuration indexes of the plurality of SPS PDSCH occasions is lower than a configuration index of any SPS PDSCH occasion of the set of SPS PDSCH occasions that is not also in the plurality of SPS PDSCH occasions.

Aspect 15: The method of Aspect 14, further comprising determining that a number of DCI transmissions of a set of DCI transmissions that include the DCI transmission and the at least one additional DCI transmission is greater than the number of SPS PDSCH occasions in the set of SPS PDSCH occasions by at least one excess DCI transmission, wherein determining the location in the static HARQ-ACK codebook for the HARQ-ACK feedback comprises determining the location in the static HARQ-ACK codebook for the HARQ-ACK feedback associated with the at least one excess DCI transmission based at least in part on a default PDSCH occasion.

Aspect 16: The method of any of Aspects 2-15, wherein determining the location in the static HARQ-ACK codebook for the HARQ-ACK feedback comprises appending one or more dedicated bits to the static HARQ-ACK codebook.

Aspect 17: The method of Aspect 16, wherein a dedicated bit of the one or more dedicated bits is associated with the SPS PDSCH configuration.

Aspect 18: The method of Aspect 17, further comprising: receiving at least one additional DCI transmission that indicates at least one additional unified TCI, wherein the at least one additional DCI transmission comprises at least one additional SPS-release DCI transmission; and determining a location in the static HARQ-ACK codebook for an additional HARQ-ACK feedback corresponding to the at least one additional DCI transmission based at least in part on at least one additional dedicated bit of the one or more dedicated bits being associated with the at least one additional DCI transmission, wherein the dedicated bit and the at least one additional dedicated bits are different.

Aspect 19: The method of Aspect 1, wherein transmitting the HARQ feedback comprises transmitting the HARQ feedback using a dynamic HARQ-ACK codebook, and wherein the method further comprises determining a location in the dynamic HARQ-ACK codebook for the HARQ-ACK feedback.

Aspect 20: The method of Aspect 19, wherein determining the location in the dynamic HARQ-ACK codebook for the HARQ-ACK feedback comprises determining the location in the dynamic HARQ-ACK codebook for the HARQ-ACK feedback based at least in part on a downlink assignment indicator indicated in the DCI transmission.

Aspect 21: The method of any of Aspects 1-20, wherein receiving the DCI transmission comprises receiving the DCI transmission in a first slot, and wherein transmitting the HARQ-ACK feedback comprises transmitting the HARQ-ACK feedback using a physical uplink control channel (PUCCH) transmission in a second slot, wherein the second slot is separated from the first slot by a number of slots indicated by a value of a slot parameter.

Aspect 22: The method of Aspect 21, wherein the DCI transmission comprises a physical downlink shared channel (PDSCH)-to-HARQ feedback timing indicator field, and wherein the PDSCH-to-HARQ feedback timing indicator field indicates the value of the slot parameter.

Aspect 23: The method of Aspect 21, wherein the DCI transmission comprises a data-to-uplink timing indicator field, and wherein the data-to-uplink timing indicator field indicates the value of the slot parameter.

Aspect 24: The method of Aspect 23, wherein the value of the slot parameter is zero, and wherein the second slot comprises a last slot of the PUCCH transmission that overlaps with reception of the DCI transmission.

Aspect 25: A method of wireless communication performed by a base station, comprising: transmitting a downlink control information (DCI) transmission that indicates a unified transmission configuration indicator (TCI), wherein the DCI transmission comprises a semi-persistent scheduling (SPS)-release DCI transmission releasing an SPS physical downlink shared channel (PDSCH) configuration; and receiving hybrid automatic repeat request acknowledgement (HARQ-ACK) feedback using a HARQ-ACK codebook, wherein the HARQ-ACK feedback comprises an acknowledgment (ACK) to indicate successful reception of the unified TCI in the DCI transmission or a negative acknowledgement (NACK) to indicate a failed reception of the unified TCI in the DCI transmission.

Aspect 26: The method of Aspect 25, wherein receiving the HARQ feedback comprises receiving the HARQ feedback using a static HARQ-ACK codebook based at least in part on a determination of a location in the static HARQ-ACK codebook for the HARQ-ACK feedback.

Aspect 27: The method of Aspect 26, wherein the determination of the location in the static HARQ-ACK codebook for the HARQ-ACK feedback is based at least in part on an SPS PDSCH occasion corresponding to the SPS PDSCH configuration, wherein the SPS PDSCH configuration is activated.

Aspect 28: The method of Aspect 26, wherein the determination of the location in the static HARQ-ACK codebook for the HARQ-ACK feedback is based at least in part on a most recently activated SPS PDSCH occasion, wherein the SPS PDSCH configuration is not activated.

Aspect 29: The method of Aspect 28, wherein the most recently activated SPS PDSCH occasion comprises an only SPS PDSCH occasion configured in a serving cell of the UE.

Aspect 30: The method of Aspect 28, wherein a most recently activated SPS PDSCH occasion is associated with a HARQ identifier indicated in the DCI transmission.

Aspect 31: The method of any of Aspects 26-30, wherein the location in the static HARQ-ACK codebook for the HARQ-ACK feedback is based at least in part on a default PDSCH occasion.

Aspect 32: The method of Aspect 31, wherein the default PDSCH occasion is based at least in part on a PDSCH occasion index.

Aspect 33: The method of Aspect 32, wherein the PDSCH occasion index comprises a lowest PDSCH occasion index.

Aspect 34: The method of any of Aspects 31-33, further comprising transmitting a default PDSCH occasion configuration that configures the default PDSCH occasion.

Aspect 35: The method of Aspect 34, wherein transmitting the default PDSCH occasion configuration comprises transmitting at least one of: a radio resource control message, a dummy SPS activation DCI transmission, a PDSCH occasion indication, or a time domain resource assignment.

Aspect 36: The method of any of Aspects 26-35, further comprising: transmitting an additional DCI transmission that indicates an additional unified TCI, wherein the additional DCI transmission comprises an additional SPS-release DCI transmission releasing an the SPS PDSCH configuration, wherein the additional DCI transmission is associated with a location in the static HARQ-ACK codebook with which the DCI transmission is associated; and wherein the additional DCI transmission comprises an error based at least in part on a determination that the additional DCI transmission is associated with the location in the static HARQ-ACK codebook with which the DCI transmission is associated.

Aspect 37: The method of any of Aspects 26-35, wherein the SPS PDSCH configuration corresponds to a set of SPS PDSCH occasions, the method further comprising: transmitting at least one additional DCI transmission that indicates at least one additional unified TCI, wherein the at least one additional DCI transmission comprises at least one additional SPS-release DCI transmission releasing the SPS PDSCH configuration; and wherein a number of SPS PDSCH occasions in the set of SPS PDSCH occasions is greater than, or equal to, a number of unified TCIs in a set of unified TCIs that includes the unified TCI and the at least one additional unified TCI, and wherein the location in the static HARQ-ACK codebook for the HARQ-ACK feedback is based at least in part on a plurality of locations associated with a plurality of SPS PDSCH occasions of the set of SPS PDSCH occasions, wherein each of a plurality of SPS configuration indexes of the plurality of SPS PDSCH occasions is lower than a configuration index of any SPS PDSCH occasion of the set of SPS PDSCH occasions that is not also in the plurality of SPS PDSCH occasions.

Aspect 38: The method of any of Aspects 26-35, wherein the SPS PDSCH configuration corresponds to a set of SPS PDSCH occasions, the method further comprising: transmitting at least one additional DCI transmission that indicates at least one additional unified TCI, wherein the at least one additional DCI transmission comprises at least one additional SPS-release DCI transmission releasing the SPS PDSCH configuration; wherein a number of SPS PDSCH occasions in the set of SPS PDSCH occasions is less than a number of unified TCIs in a set of unified TCIs that includes the unified TCI and the at least one additional unified TCI; wherein a HARQ-ACK codebook DCI field includes a semi-static indication, wherein the location in the static HARQ-ACK codebook for the HARQ-ACK feedback is based at least in part on a plurality of locations associated with a plurality of SPS PDSCH occasions of the set of SPS PDSCH occasions, wherein each of a plurality of SPS configuration indexes of the plurality of SPS PDSCH occasions is lower than a configuration index of any SPS PDSCH occasion of the set of SPS PDSCH occasions that is not also in the plurality of SPS PDSCH occasions.

Aspect 39: The method of Aspect 38, wherein a number of DCI transmissions of a set of DCI transmissions that include the DCI transmission and the at least one additional DCI transmission is greater than the number of SPS PDSCH occasions in the set of SPS PDSCH occasions by at least one excess DCI transmission, and wherein the location in the static HARQ-ACK codebook for the HARQ-ACK feedback comprises a location in the static HARQ-ACK codebook for the HARQ-ACK feedback associated with the at least one excess DCI transmission based at least in part on a default PDSCH occasion.

Aspect 40: The method of any of Aspects 26-39, wherein the location in the static HARQ-ACK codebook for the HARQ-ACK feedback comprises one or more dedicated bits appended to the static HARQ-ACK codebook.

Aspect 41: The method of Aspect 40, wherein a dedicated bit of the one or more dedicated bits is associated with the SPS PDSCH configuration.

Aspect 42: The method of Aspect 41, further comprising: transmitting at least one additional DCI transmission that indicates at least one additional unified TCI, wherein the at least one additional DCI transmission comprises at least one additional SPS-release DCI transmission, wherein a location in the static HARQ-ACK codebook for an additional HARQ-ACK feedback corresponding to the at least one additional DCI transmission is based at least in part on at least one additional dedicated bit of the one or more dedicated bits being associated with the at least one additional DCI transmission, wherein the dedicated bit and the at least one additional dedicated bits are different.

Aspect 43: The method of Aspect 25, wherein receiving the HARQ feedback comprises receiving the HARQ feedback using a dynamic HARQ-ACK codebook, and wherein a location in the dynamic HARQ-ACK codebook contains the HARQ-ACK feedback.

Aspect 44: The method of Aspect 43, wherein the location in the dynamic HARQ-ACK codebook for the HARQ-ACK feedback is based at least in part on a downlink assignment indicator indicated in the DCI transmission.

Aspect 45: The method of any of Aspects 25-44, wherein transmitting the DCI transmission comprises transmitting the DCI transmission in a first slot, and wherein receiving the HARQ-ACK feedback comprises receiving the HARQ-ACK feedback using a physical uplink control channel (PUCCH) transmission in a second slot, wherein the second slot is separated from the first slot by a number of slots indicated by a value of a slot parameter.

Aspect 46: The method of Aspect 45, wherein the DCI transmission comprises a physical downlink shared channel (PDSCH)-to-HARQ feedback timing indicator field, and wherein the PDSCH-to-HARQ feedback timing indicator field indicates the value of the slot parameter.

Aspect 47: The method of Aspect 45, wherein the DCI transmission comprises a data-to-uplink timing indicator field, and wherein the data-to-uplink timing indicator field indicates the value of the slot parameter.

Aspect 48: The method of Aspect 47, wherein the value of the slot parameter is zero, and wherein the second slot comprises a last slot of the PUCCH transmission that overlaps with reception of the DCI transmission.

Aspect 49: An apparatus for wireless communication at a device, comprising a processor; memory coupled with the processor; and instructions stored in the memory and executable by the processor to cause the apparatus to perform the method of one or more of Aspects 1-24.

Aspect 50: A device for wireless communication, comprising a memory and one or more processors coupled to the memory, the memory and the one or more processors configured to perform the method of one or more of Aspects 1-24.

Aspect 51: An apparatus for wireless communication, comprising at least one means for performing the method of one or more of Aspects 1-24.

Aspect 52: A non-transitory computer-readable medium storing code for wireless communication, the code comprising instructions executable by a processor to perform the method of one or more of Aspects 1-24.

Aspect 53: A non-transitory computer-readable medium storing a set of instructions for wireless communication, the set of instructions comprising one or more instructions that, when executed by one or more processors of a device, cause the device to perform the method of one or more of Aspects 1-24.

Aspect 54: An apparatus for wireless communication at a device, comprising a processor; memory coupled with the processor; and instructions stored in the memory and executable by the processor to cause the apparatus to perform the method of one or more of Aspects 25-48.

Aspect 55: A device for wireless communication, comprising a memory and one or more processors coupled to the memory, the memory and the one or more processors configured to perform the method of one or more of Aspects 25-48.

Aspect 56: An apparatus for wireless communication, comprising at least one means for performing the method of one or more of Aspects 25-48.

Aspect 57: A non-transitory computer-readable medium storing code for wireless communication, the code comprising instructions executable by a processor to perform the method of one or more Aspects of 25-48.

Aspect 58: A non-transitory computer-readable medium storing a set of instructions for wireless communication, the set of instructions comprising one or more instructions that, when executed by one or more processors of a device, cause the device to perform the method of one or more of Aspects 25-48.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). No element, act, or instruction used herein should be construed as critical or essential unless explicitly described as such.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a UE, comprising:

receiving a downlink control information (DCI) transmission that indicates a unified transmission configuration indicator (TCI), wherein the DCI transmission comprises a semi-persistent scheduling (SPS)-release DCI transmission releasing an SPS physical downlink shared channel (PDSCH) configuration;

transmitting hybrid automatic repeat request acknowledgement (HARQ-ACK) feedback using a HARQ-ACK codebook, wherein the HARQ-ACK feedback comprises an acknowledgment (ACK) to indicate successful reception of the unified TCI in the DCI transmission or a negative acknowledgement (NACK) to indicate a failed reception of the unified TCI in the DCI transmission;

determining a location in the HARQ-ACK codebook for the HARQ-ACK feedback;

receiving an additional DCI transmission that indicates an additional unified TCI, wherein the additional DCI transmission comprises an additional SPS-release DCI transmission releasing the SPS PDSCH configuration or an additional SPS release DCI transmission; and either:

identifying the additional DCI transmission as an error based at least in part on determining that the additional DCI transmission is associated with the location in the HARQ-ACK codebook with which the DCI transmission is associated, wherein the additional DCI transmission comprises an additional SPS-release DCI transmission releasing an the SPS PDSCH configuration, determining whether a quantity of SPS PDSCH occasions in a set of SPS PDSCH occasions is greater than, or equal to, a quantity of unified TCIs in a set of unified TCIs that includes the unified TCI and the additional unified TCI, wherein the SPS PDSCH configuration corresponds to the set of SPS PDSCH occasions, wherein the location is determined in the HARQ-ACK codebook based at least in part on a plurality of locations associated with a plurality of SPS PDSCH occasions of the set of SPS PDSCH occasions, wherein each of a plurality of SPS configuration indexes of the plurality of SPS PDSCH occasions is lower than a configuration index of any SPS PDSCH occasion of the set of SPS PDSCH occasions that is not also in the plurality of SPS PDSCH occasions, or determining a location in the HARQ-ACK codebook for an additional HARQ-ACK feedback corresponding to the additional DCI transmission based at least in part on a dedicated bit, of one or more bits appended to the HARQ-ACK codebook, being associated with the at least one additional DCI transmission.

2. The method of claim 1,
wherein the HARQ-ACK codebook is a static HARQ-ACK codebook.

3. The method of claim 1, further comprising determining that the SPS PDSCH configuration is activated,
wherein determining the location in the HARQ-ACK codebook for the HARQ-ACK feedback comprises determining the location in the HARQ-ACK codebook for the HARQ-ACK feedback based at least in part on an SPS PDSCH occasion corresponding to the SPS PDSCH configuration.

4. The method of claim 1, further comprising determining that the SPS PDSCH configuration is not activated,
wherein determining the location in the HARQ-ACK codebook for the HARQ-ACK feedback comprises determining the location in the HARQ-ACK codebook for the HARQ-ACK feedback based at least in part on a most recently activated SPS PDSCH occasion.

5. The method of claim 4,
wherein the most recently activated SPS PDSCH occasion comprises an only SPS PDSCH occasion configured in a serving cell of the UE.

6. The method of claim 4, further comprising identifying a plurality of configured SPS PDSCH occasions, wherein the most recently activated SPS PDSCH occasion is associated with a HARQ identifier indicated in the DCI transmission.

7. The method of claim 1,
wherein determining the location in the HARQ-ACK codebook for the HARQ-ACK feedback comprises determining the location in the HARQ-ACK codebook for the HARQ-ACK feedback based at least in part on a default PDSCH occasion.

8. The method of claim 7,
wherein the default PDSCH occasion is based at least in part on a PDSCH occasion index.

9. The method of claim 8,
wherein the PDSCH occasion index comprises a lowest PDSCH occasion index.

10. The method of claim 7, further comprising receiving a default PDSCH occasion configuration that configures the default PDSCH occasion.

11. The method of claim 10,
wherein receiving the default PDSCH occasion configuration comprises receiving at least one of:
a radio resource control message,
a dummy SPS activation DCI transmission,
a PDSCH occasion indication, or
a time domain resource assignment.

12. The method of claim 1, further comprising:
determining that the additional DCI transmission is associated with the location in the HARQ-ACK codebook with which the DCI transmission is associated; and
identifying the additional DCI transmission as the error based at least in part on determining that the additional DCI transmission is associated with the location in the HARQ-ACK codebook with which the DCI transmission is associated.

13. The method of claim 1,
wherein the SPS PDSCH configuration corresponds to the set of SPS PDSCH occasions, and
wherein determining whether the quantity of SPS PDSCH occasions in the set of SPS PDSCH occasions is greater than, or equal to, the quantity of unified TCIs in the set of unified TCIs that includes the unified TCI and the additional unified TCI comprises:
determining that the quantity of SPS PDSCH occasions in the set of SPS PDSCH occasions is greater than, or equal to, the quantity of unified TCIs in the set of unified TCIs that includes the unified TCI and the additional unified TCI,
wherein determining the location in the HARQ-ACK codebook for the HARQ-ACK feedback comprises determining the location in the HARQ-ACK codebook for the HARQ-ACK feedback based at least in part on the plurality of locations associated with the plurality of SPS PDSCH occasions of the set of SPS PDSCH occasions, wherein each of a plurality of SPS configuration indexes of the plurality of SPS PDSCH occasions is lower than the configuration index of any SPS PDSCH occasion of the set of SPS PDSCH occasions that is not also in the plurality of SPS PDSCH occasions.

14. The method of claim 1,
wherein the SPS PDSCH configuration corresponds to a set of SPS PDSCH occasions, and
wherein determining whether the quantity of SPS PDSCH occasions in the set of SPS PDSCH occasions is greater than, or equal to, the quantity of unified TCIs in the set of unified TCIs that includes the unified TCI and the additional unified TCI comprises:
determining that the quantity of SPS PDSCH occasions in the set of SPS PDSCH occasions is less than the quantity of unified TCIs in the set of unified TCIs that includes the unified TCI and the additional unified TCI; and
determining that a HARQ-ACK codebook DCI field includes a semi-static indication,
wherein determining the location in the HARQ-ACK codebook for the HARQ-ACK feedback comprises determining the location in the static HARQ-ACK codebook for the HARQ-ACK feedback based at least in part on the plurality of locations associated with the plurality of SPS PDSCH occasions of the set of SPS PDSCH occasions, wherein each of the plurality of SPS configuration indexes of the plurality of SPS PDSCH occasions is lower than the configuration index of any SPS PDSCH occasion of the set of SPS PDSCH occasions that is not also in the plurality of SPS PDSCH occasions.

15. The method of claim 14, further comprising determining that a quantity of DCI transmissions of a set of DCI transmissions that include the DCI transmission and the additional DCI transmission is greater than the quantity of SPS PDSCH occasions in the set of SPS PDSCH occasions by at least one excess DCI transmission,
wherein determining the location in the HARQ-ACK codebook for the HARQ-ACK feedback comprises determining the location in the HARQ-ACK codebook for the HARQ-ACK feedback associated with the at least one excess DCI transmission based at least in part on a default PDSCH occasion.

16. The method of claim 1, wherein determining the location in the HARQ-ACK codebook for the HARQ-ACK feedback comprises appending the one or more bits to the HARQ-ACK codebook.

17. The method of claim 1, wherein a second dedicated bit, of the one or more bits, is associated with the SPS PDSCH configuration.

18. The method of claim 1, further comprising:

determining the location in the HARQ-ACK codebook for the additional HARQ-ACK feedback corresponding to the additional DCI transmission based at least in part on the dedicated bit, of the one or more bits, being associated with the additional DCI transmission.

19. The method of claim 1, wherein transmitting the HARQ-ACK feedback comprises transmitting the HARQ-ACK feedback using a dynamic HARQ-ACK codebook.

20. The method of claim 19, wherein determining the location in the dynamic HARQ-ACK codebook for the HARQ-ACK feedback comprises determining the location in the dynamic HARQ-ACK codebook for the HARQ-ACK feedback based at least in part on a downlink assignment indicator indicated in the DCI transmission.

21. The method of claim 1, wherein receiving the DCI transmission comprises receiving the DCI transmission in a first slot, and wherein transmitting the HARQ-ACK feedback comprises transmitting the HARQ-ACK feedback using a physical uplink control channel (PUCCH) transmission in a second slot, wherein the second slot is separated from the first slot by a number of slots indicated by a value of a slot parameter.

22. The method of claim 21, wherein the DCI transmission comprises Ap DSCH-to-HARQ feedback timing indicator field, and wherein the PDSCH-to-HARQ feedback timing indicator field indicates the value of the slot parameter.

23. The method of claim 21, wherein the DCI transmission comprises a data-to-uplink timing indicator field, and wherein the data-to-uplink timing indicator field indicates the value of the slot parameter.

24. The method of claim 23, wherein the value of the slot parameter is zero, and wherein the second slot comprises a last slot of the PUCCH transmission that overlaps with reception of the DCI transmission.

25. A user equipment (UE) for wireless communication, comprising:

one or more memories; and one or more processors, coupled to the one or more memories, configured to:

receive a downlink control information (DCI) transmission that indicates a unified transmission configuration indicator (TCI), wherein the DCI transmission comprises a semi-persistent scheduling (SPS)-release DCI transmission releasing an SPS physical downlink shared channel (PDSCH) configuration;

transmit hybrid automatic repeat request acknowledgement (HARQ-ACK) feedback using a HARQ-ACK codebook, wherein the HARQ-ACK feedback comprises an acknowledgment (ACK) to indicate successful reception of the unified TCI in the DCI transmission or a negative acknowledgement (NACK) to indicate a failed reception of the unified TCI in the DCI transmission;

determine a location in the HARQ-ACK codebook for the HARQ-ACK feedback;

receive an additional DCI transmission that indicates an additional unified TCI, wherein the additional DCI transmission comprises an additional SPS-release DCI transmission releasing the SPS PDSCH configuration; and either:

identify the additional DCI transmission as an error based at least in part on determining that the additional DCI transmission is associated with the location in the HARQ-ACK codebook with which the DCI transmission is associated, wherein the additional DCI transmission comprises an additional SPS-release DCI transmission releasing an the SPS PDSCH configuration, determine whether a quantity of SPS PDSCH occasions in a set of SPS PDSCH occasions is greater than, or equal to, a quantity of unified TCIs in a set of unified TCIs that includes the unified TCI and the additional unified TCI, wherein the SPS PDSCH configuration corresponds to the set of SPS PDSCH occasions, wherein the location is determined in the HARQ-ACK codebook based at least in part on a plurality of locations associated with a plurality of SPS PDSCH occasions of the set of SPS PDSCH occasions, wherein each of a plurality of SPS configuration indexes of the plurality of SPS PDSCH occasions is lower than a configuration index of any SPS PDSCH occasion of the set of SPS PDSCH occasions that is not also in the plurality of SPS PDSCH occasions, or determine a location in the HARQ-ACK codebook for an additional HARQ-ACK feedback corresponding to the additional DCI transmission based at least in part on a dedicated bit, of one or more bits appended to the HARQ-ACK codebook, being associated with the at least one additional DCI transmission.

* * * * *